(12) United States Patent
Jelinek et al.

(10) Patent No.: US 12,064,384 B2
(45) Date of Patent: Aug. 20, 2024

(54) OVERHEAD LIFTS HAVING A RELEASE ASSEMBLY FOR DISENGAGING AN ELECTROMAGNETIC BRAKE AND METHODS FOR DISENGAGING AN ELECTROMAGNETIC BRAKE OF AN OVERHEAD LIFT

(71) Applicant: Liko Research & Development AB, Luleå (SE)

(72) Inventors: Jeffrey Scott Jelinek, Batesville, IN (US); Jonathan K. Moenter, Batesville, IN (US); Jonathan D. Turner, Dillsboro, IN (US)

(73) Assignee: LIKO Research & Development AB, Luleå (SE)

( * ) Notice: Subject to any disclaimer, the term of this patent is extended or adjusted under 35 U.S.C. 154(b) by 476 days.

(21) Appl. No.: 17/519,077

(22) Filed: Nov. 4, 2021

(65) Prior Publication Data

US 2022/0142841 A1 May 12, 2022

Related U.S. Application Data

(60) Provisional application No. 63/110,703, filed on Nov. 6, 2020.

(51) Int. Cl.
*A61G 7/10* (2006.01)
*B66D 3/20* (2006.01)
(Continued)

(52) U.S. Cl.
CPC ......... *A61G 7/1015* (2013.01); *A61G 7/1051* (2013.01); *B66D 3/20* (2013.01);
(Continued)

(58) Field of Classification Search
CPC ...... A61G 7/1015; A61G 7/1051; B66D 3/20; B66D 3/26; B66D 2700/03; H02P 3/04
(Continued)

(56) References Cited

U.S. PATENT DOCUMENTS 8,128,068 B2 3/2012 Chepurny et al.
9,181,071 B2 * 11/2015 Hagihara ................. B66D 5/30
(Continued)

FOREIGN PATENT DOCUMENTS

CN 209210268 U 8/2019

OTHER PUBLICATIONS

GO Kenji (JP 2001165208 A) Electric Brake Device Date Published Jun. 19, 2001 (Year: 2001).*
(Continued)

*Primary Examiner* — Jorge L Carrasquillo
(74) *Attorney, Agent, or Firm* — Dinsmore & Shohl LLP

(57) ABSTRACT

An overhead lift includes a lift strap, a motor, an electromagnetic brake, and a release assembly. The motor includes a rotatable shaft coupled to the lift strap. The electromagnetic brake is coupled to the rotatable shaft and has an engaged state and a disengaged state. The release assembly is engaged with the electromagnetic brake. The release assembly incudes a release lever engaged with the electromagnetic brake and a release strap. The release lever is moveable between a first position and a second position, wherein the release lever switches the electromagnetic brake to the disengaged state when in the second position. The release strap is coupled to the release lever. Tensioning of the release strap moves the release lever from the first position to the second position thereby switching the electromagnetic brake to the disengaged state.

20 Claims, 14 Drawing Sheets

(51) Int. Cl.
*B66D 3/26* (2006.01)
*H02P 3/04* (2006.01)

(52) U.S. Cl.
CPC .................. *B66D 3/26* (2013.01); *H02P 3/04* (2013.01); *B66D 2700/03* (2013.01)

(58) Field of Classification Search
USPC ........................................................ 319/63
See application file for complete search history.

(56) References Cited

U.S. PATENT DOCUMENTS

| | | |
|---|---|---|
| 10,010,468 B2 | 7/2018 | Duquette et al. |
| 10,112,810 B2 | 10/2018 | Golder |
| 10,610,431 B2 | 4/2020 | Andersson et al. |
| 2019/0151178 A1 | 5/2019 | Westwood et al. |
| 2020/0078244 A1* | 3/2020 | Newman .............. A61G 7/1051 |

OTHER PUBLICATIONS

Hagihara, Shinji (CN 103459300 A)Winding Gear Comprising De-energization Type Electromagnetic Break Date Published Dec. 18, 2013 (Year: 2013).*

* cited by examiner

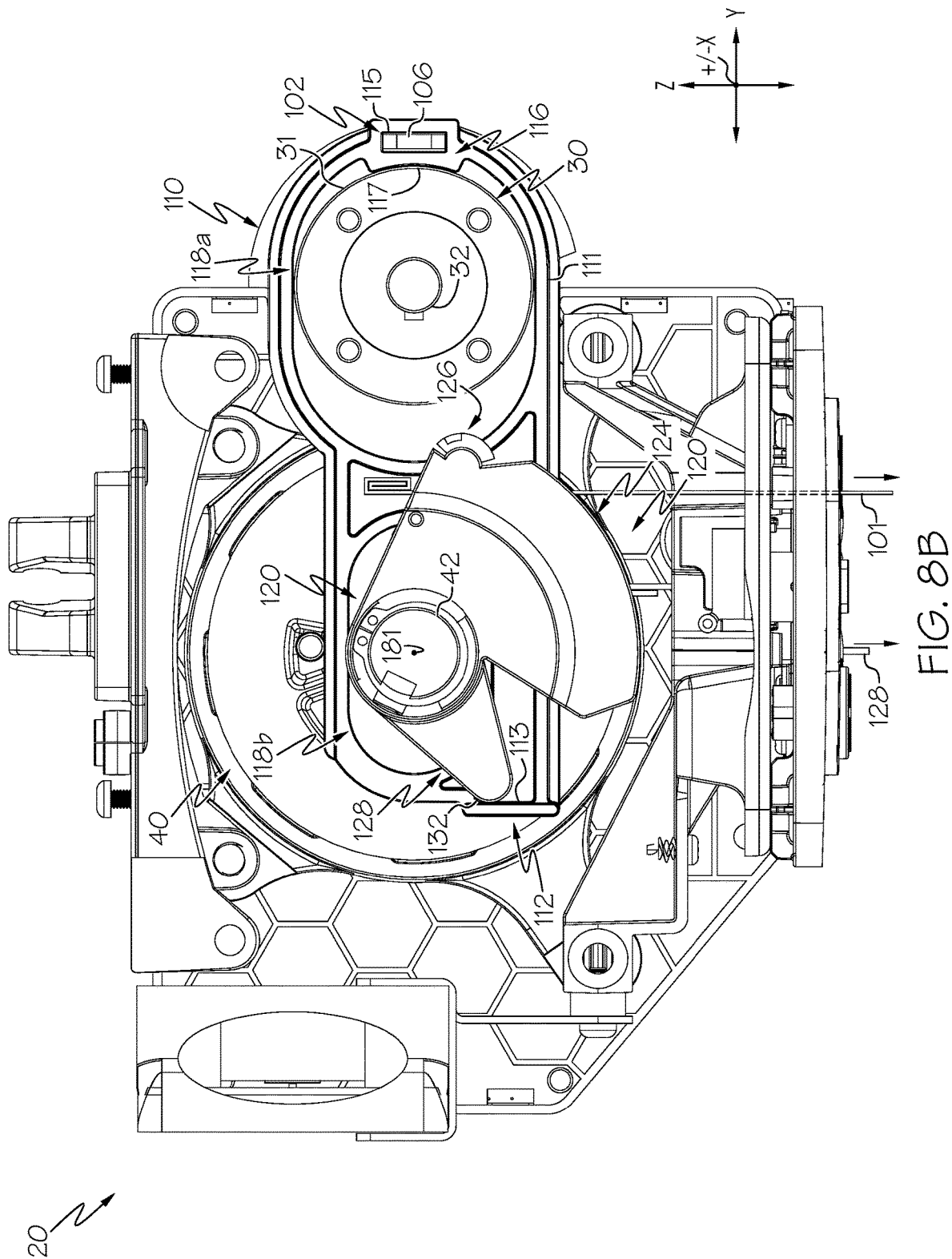

OVERHEAD LIFTS HAVING A RELEASE ASSEMBLY FOR DISENGAGING AN ELECTROMAGNETIC BRAKE AND METHODS FOR DISENGAGING AN ELECTROMAGNETIC BRAKE OF AN OVERHEAD LIFT

CROSS-REFERENCE TO RELATED APPLICATIONS

The present application claims the benefit of U.S. Provisional Application Ser. No. 63/110,703, filed Nov. 6, 2020, the entirety of which is incorporated by reference herein.

TECHNICAL FIELD

The present specification generally relates to overhead lifts and, more specifically, to overhead lifts having a release assembly and methods for disengaging one or more electromagnetic brakes of the overhead lift to allow for manual pay-out of a lift strap of the overhead lift.

BACKGROUND

Overhead lifts may be motorized to lift and/or lower a subject. For example, overhead lifts may include a lift strap which is paid-out from and taken-up into the overhead lift. Under some circumstances, a motor of the overhead lift may become inoperable to lift and/or lower a subject. For example, a battery of the overhead lift may be in need of charging, etc. Under circumstances when the overhead lift becomes inoperable, a user may need to manually access the overhead lift to back drive the overhead lift's drivetrain to pay-out an additional length of the lift strap, such as to lower a subject to a support surface. Back driving the drivetrain may require a user ascending a ladder to access the overhead lift, which may further require removing a housing to access the drivetrain. Other solutions may include a ratcheting mechanism which allows the strap to be incrementally paid-out. However, where a subject is supported by the overhead lift, incremental lowering may be unsettling or uncomfortable for a subject and may take a substantial amount of time to fully lower a subject.

Accordingly, a need exists for alternative overhead lifts having a release assembly that allows a drivetrain of the overhead lift to be back driven to allow smooth pay-out of the lift strap.

SUMMARY

In a first aspect A1, an overhead includes a lift strap, a motor, an electromagnetic brake, and a release assembly. The motor includes a rotatable shaft coupled to the lift strap, the rotatable shaft having a first rotational direction wherein the lift strap is paid-out from the overhead lift and a second rotational direction wherein the lift strap is taken-up into the overhead lift. The electromagnetic brake is coupled to the rotatable shaft. The electromagnetic brake has an engaged state wherein the electromagnetic brake prohibits rotation of the rotatable shaft and a disengaged state wherein the electromagnetic brake permits rotation of the rotatable shaft. The release assembly is engaged with the electromagnetic brake, wherein actuation of the release assembly switches the electromagnetic brake from the engaged state to the disengaged state and includes a release lever and a release strap. The release lever is engaged with the electromagnetic brake and moveable between a first position and a second position, wherein the release lever switches the electromagnetic brake to the disengaged state when in the second position. The release strap is coupled to the release lever. Tensioning of the release strap moves the release lever from the first position to the second position thereby switching the electromagnetic brake from the engaged state to the disengaged state. A second as aspect includes the first aspect A2, wherein motion of the release lever from the first position to the second position moves a lever arm of the release lever closer to an axis of rotation of the rotatable shaft. A third aspect A3 includes any preceding aspect, wherein the release assembly further includes a sliding plate engaged with the release lever, the release strap is coupled to the sliding plate such that tensioning the release strap slides the sliding plate from a first lateral position to a second lateral position, and the sliding plate pulls the release lever to the second position when the sliding plate transitions from the first lateral position to the second lateral position. A fourth aspect A4 includes any preceding aspect, wherein the sliding plate includes an aperture extending around the motor, and a lever opening formed within a wall of the aperture, and a lever arm of the release lever extends through the lever opening thereby engaging the lever arm with the sliding plate. A fifth aspect A5 includes any preceding aspect, wherein the release assembly further includes a cam rotatable about a cam rotation axis and comprising a lobe, the cam is coupled to the release strap such that tensioning the release strap causes the cam to rotate about the cam rotation axis from a first radial position to a second radial position, the sliding plate further includes a follower plate positioned to contact the lobe, and rotation of the cam to the second radial position causes the lobe to push against the follower plate and slide the sliding plate from the first lateral position to the second lateral position thereby pulling the release lever from the first position to the second position and releasing the electromagnetic brake. A sixth aspect A6 includes any preceding aspect, further including a torsion spring biasing the cam to the first radial position such that the torsion spring returns the cam to the first radial position upon release of tension on the release strap. A seventh aspect A7 includes any preceding aspect, wherein the release assembly further includes a pinion gear coupled to the release strap, and a rack gear meshed with the pinion gear and coupled to the release lever, and tensioning the release strap rotates the pinion gear thereby laterally translating the rack gear and pulling the release lever to the second position. An eighth aspect A8 includes any preceding aspect, wherein the release assembly further includes a pulley, the lift strap is arranged around the pulley and is attached to the release lever, and tensioning the release strap causes the pulley to rotate about a pulley axis and causes the release lever to move from the first position to the second position, thereby releasing the electromagnetic brake.

In a ninth aspect A9, an overhead lift includes a lift strap, a drum coupled to the lift strap, a motor, an electromagnetic brake, and a release assembly engaged with the electromagnetic brake. The drum is rotatable in a first rotational direction wherein the lift strap is paid-out from the overhead lift and in a second rotational direction wherein the lift strap is taken-up into the overhead lift. The motor includes a rotatable shaft coupled to the drum such that rotation of the rotatable shaft rotates the drum in the first rotational direction or the second rotational direction. The electromagnetic brake is coupled to the rotatable shaft and has an engaged state wherein the electromagnetic brake prohibits rotation of the rotatable shaft and a disengaged state wherein the electromagnetic brake permits rotation of the rotatable shaft.

Actuation of the release assembly switches the electromagnetic brake from the engaged state to the disengaged state. The release assembly includes a release lever, a cam, and a release strap. The release lever is engaged with the electromagnetic brake and moveable between a first position and a second position, wherein the release lever switches the electromagnetic brake to the disengaged state when in the second position. The cam is coupled to the release lever, wherein the cam is rotatable from a first radial position to a second radial position, wherein rotation to the second radial position causes the release lever to move to the second position. The release strap is coupled to the cam, wherein tensioning of the release strap moves the cam from the first radial position to the second radial position, which moves the release lever from the first position to the second position thereby switching the electromagnetic brake from the engaged state to the disengaged state. A tenth aspect A10 includes any preceding aspect, wherein motion of the release lever from the first position to the second position moves a lever arm of the release lever closer to an axis of rotation of the rotatable shaft. An eleventh aspect A11 includes any preceding aspect, wherein the release assembly further includes a sliding plate engaged with the release lever, the cam is engaged with the sliding plate such that movement of the cam from the first radial position to the second radial position slides the sliding plate from a first lateral position to a second lateral position, and the sliding plate pulls the release lever to the second position as the sliding plate transitions from the first lateral position to the second lateral position. A twelfth aspect A12 includes any preceding aspect, wherein the sliding plates includes a first aperture extending around the motor, a second aperture extending around a drum shaft of the drum and a lever opening formed within a wall of the first aperture, and a lever arm of the release lever extends through the lever opening thereby engaging the lever arm with the sliding plate. A thirteenth aspect A13 includes any preceding aspect wherein the cam includes a lobe, the sliding plate further includes a follower plate positioned to contact the lobe, and rotation of the cam to the second radial position causes the lobe to push against the follower plate and slide the sliding plate from the first lateral position to the second lateral position thereby pulling the release lever from the first position to the second position and releasing the electromagnetic brake. A fourteenth aspect A14 includes any preceding aspect, further including a torsion spring biasing the cam to the first radial position such that the torsion spring returns the cam to the first radial position upon release of tension on the release strap. A fifteenth aspect A15 includes any preceding aspect, wherein the cam includes a plate, and a strap attachment point extending from the plate. A sixteenth aspect includes any preceding aspect wherein the cam includes a hub defining an opening, wherein a drum shaft of the drum is positioned within the opening, a first planar region extending from the hub, a second planar region extending from the first planar region, wherein the second planar region is longitudinally stepped from the first planar region via a connection strip in a longitudinal direction, and a strap attachment point extends from the second planar region, wherein the release strap is coupled to the strap attachment point.

In a seventeenth aspect A17, an overhead lift includes a lift strap, a drum coupled to the lift strap and rotatable in a first rotational direction wherein the lift strap is paid-out from the overhead lift and in a second rotational direction wherein the lift strap is taken-up into the overhead lift, a first motor coupled to the drum, a second motor coupled to the drum, a first electromagnetic brake selectively engaged with the first motor, and a second electromagnetic brake selectively engaged with the second motor, and a release assembly. Each of the first electromagnetic brake and the second electromagnetic brake comprise an engaged state prohibiting rotation of the drum and a disengaged state permitting rotation of the drum. The release assembly is engaged with the first electromagnetic brake and the second electromagnetic brake, wherein actuation of the release assembly switches the first electromagnetic brake and the second electromagnetic brake from the engaged state to the disengaged state. The release assembly includes a first release lever engaged with the first electromagnetic brake, a second release lever engaged with the second electromagnetic brake, wherein each of the first release lever and the second release lever are moveable from a first position to a second position which switches the first electromagnetic brake and the second electromagnetic brake, respectively, from the engaged state to the disengaged state, and a release strap coupled to the first release lever and the second release lever, wherein tensioning of the release strap moves the first release lever and the second release lever from the first position to the second position thereby switching the first electromagnetic brake and the second electromagnetic brake from the engaged state to the disengaged state. An eighteenth aspect A18 includes any preceding aspect, wherein the first release lever includes a lever arm extending alongside the first motor, wherein the first release lever is moveable between a first position and a second position, wherein the release lever switches the first electromagnetic brake to the disengaged state when moved to the second position, and the second release lever includes a lever arm extending alongside the second motor, wherein the second release lever is moveable between a first position and a second position, wherein the release lever switches the first electromagnetic brake to the disengaged state when moved to the second position. A nineteenth aspect A19 includes any preceding aspect, wherein motion of the first release lever and the second release lever from the first position to the second position moves the first release lever and the second release lever closer to an axis of rotation of the first motor and the second motor, respectively. A twentieth aspect A20 according to any preceding aspect, wherein the release assembly further includes a first sliding plate engaged with the first release lever, and a second sliding plate engaged with the second release lever, the release strap is coupled to the first sliding plate and the second sliding plate such that tensioning the release strap slides the first sliding plate and the second sliding plate from a first lateral position to a second lateral position, the first sliding plate pulls the first release lever to the second position when the first sliding plate transitions from the first lateral position to the second lateral position, and the second sliding plate pulls the second release lever to the second position when the second sliding plate transitions from the first lateral position to the second lateral position. A twenty-first aspect A21 including any preceding aspect, wherein each of the first sliding plate and the second sliding plate comprise a first aperture extending around the first motor or the second motor, a second aperture extending around a drum shaft of the drum, and a lever opening formed within a wall of the first aperture, a lever arm of the first release lever extends through the lever opening of the first sliding plate, and a lever arm of the second release lever extends through the lever opening of the second sliding plate. A twenty-second aspect A22 includes any preceding aspect, wherein the release assembly further includes a cam rotatable about a cam rotation axis, the cam including a first lobe and a second lobe, the cam is coupled to the release strap such that tensioning the release strap causes the cam to rotate from a first radial position to a second radial position, the first sliding plate further includes a follower plate positioned to contact the first lobe, the second sliding plate further comprises a follower plate positioned to contact the second lobe, and rotation of the cam to the second radial position causes the first lobe to push against the follower plate of the first sliding plate thereby causing the first sliding plate to slide from the first lateral position to the second lateral position, and rotation of the cam to the second radial position causes the second lobe to push against the follower plate of the second sliding plate thereby causing the second sliding plate to slide from the first lateral position to the second lateral position. A twenty-third aspect A23 includes any preceding aspect, further including a torsion spring biasing the cam to the first radial position such that the torsion spring returns the cam to the first radial position upon release of tension on the release strap.

In a twenty-fourth aspect A24 a method for disengaging an electromagnetic brake of an overhead lift according to any preceding claim includes tensioning the release strap thereby moving the release lever coupled thereto from the first position to the second position and disengaging the electromagnetic brake, holding to the release strap to maintain disengagement of the electromagnetic brake, pulling the lift strap, wherein the release strap is released from the overhead lift in a continuous motion, and releasing the release strap. A twenty-fifth aspect A25 includes the twenty-fourth aspect A24, wherein the electromagnetic brake is biased to the engaged state and releasing the release strap allows the electromagnetic brake to return to the engaged state.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 8B schematically depicts a front view of the release assembly of FIG. 8A moved to an actuated position, according to one or more embodiments shown and described herein;

DETAILED DESCRIPTION

As illustrated in the figures, embodiments of the present disclosure are directed to overhead lifts including a release assembly which allows for manual pay-out of a lift strap during such circumstances as, for example, where a motor of the overhead lift is not operational or it is desirable to not operate the motor to effect pay-out of the lift strap. In embodiments, an overhead lift generally includes a lift strap, a motor operable to pay-out or take-up the lift strap, and an electromagnetic brake. The electromagnetic brake is operable to prevent pay-out of the lift strap when the motor is not being operated to pay-out or take-up the lift strap. As noted above, under some circumstances, such as where the motor will not or cannot be operated, a user or subject may wish to manually pay-out a length of the lift strap. Accordingly, embodiments of the present disclosure are directed to release assemblies for moving the electromagnetic brake from an engaged state to a disengaged stated to allow for manual pay-out of the lift strap.

Release assemblies according to the present disclosure may generally include a release lever and a release strap operatively coupled (for example, through one or more components) to the release lever, such that tensioning or pulling on the release strap moves the release lever from a first position to a second position that biases or switches the electromagnetic brake to the disengaged state. The release strap may hang from the overhead lift so as to be grasped and pulled by a user standing on the ground or supported by the overhead lift (e.g., via sling). Accordingly, a user may disengage the electromagnetic brake from a position below the overhead lift to pull or pay-out additional length of the lift strap as desired. Additionally, as the electromagnetic brake is disengaged, the lift strap may be smoothly and uninterruptedly paid-out as desired until the user releases the release strap, allowing the electromagnetic brake to move back to the engaged state. These and additional features and benefits will be described in greater detail below with specific reference to the appended drawings.

Figure 1:
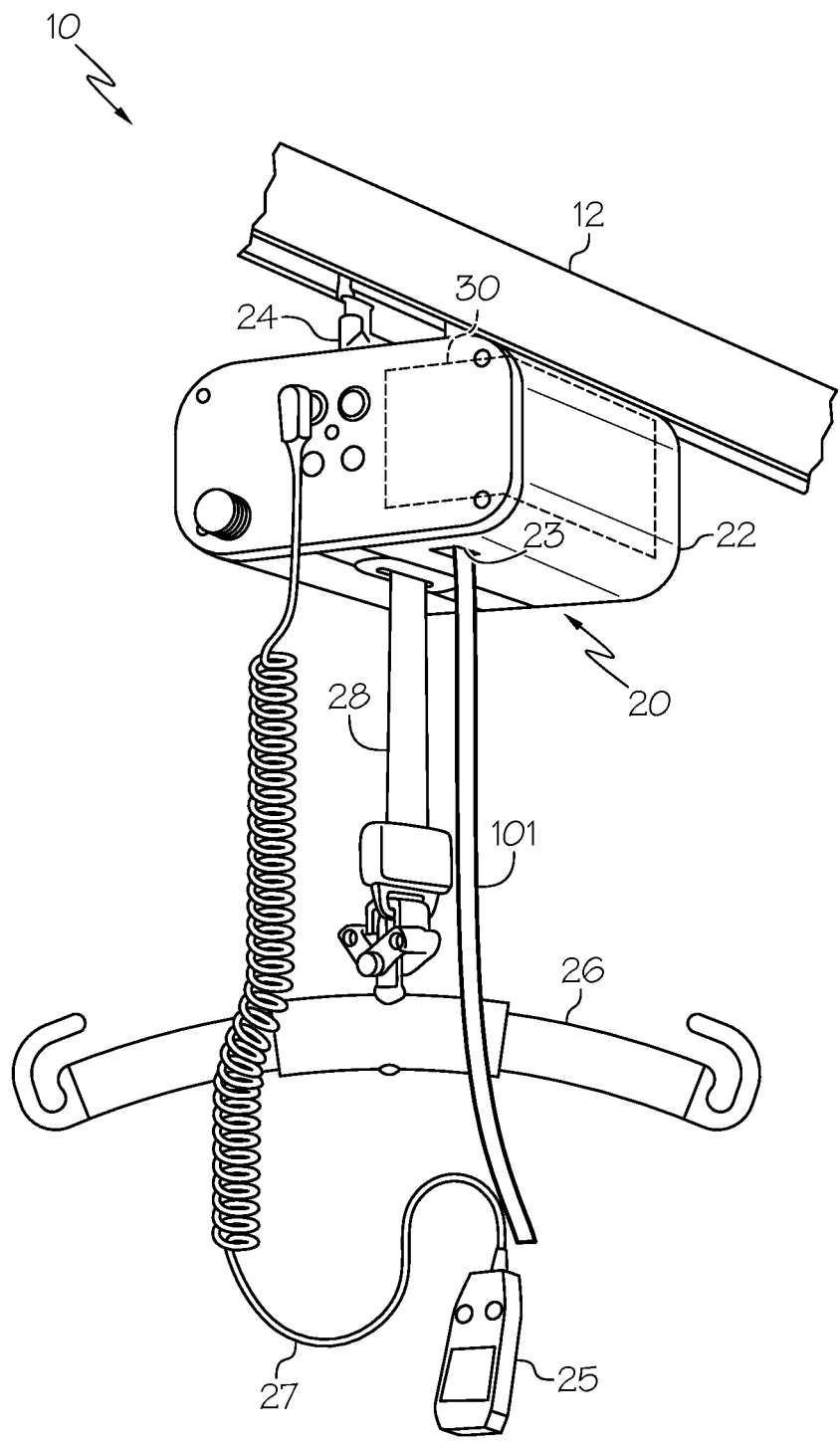
FIG. 1 schematically depicts an overhead lift, according to one or more embodiments shown and described herein.

Referring now to FIG. 1, a rail-mounted lift system 10 is schematically depicted. The rail-mounted lift system 10 generally includes an overhead lift 20 coupled to an overhead rail 12. The overhead rail 12 may be secured to a ceiling of a care room, for example. Specifically, the overhead rail 12 may be secured to structural elements of the ceiling, such as ceiling joists, by suitable fastening elements. In some embodiments, the overhead rail 12 may be suspended from the ceiling of the care room by pendants. In other embodiments, it is contemplated that the overhead rail 12 may be directly secured to the ceiling. The overhead rail 12 and the overhead lift 20 may be positioned well-above the floor, which may make directly accessing the overhead lift 20 difficult or inconvenient for a user standing on the floor.

Still referring to FIG. 1, the overhead lift 20 may include a lift housing 22 that forms an outer enclosure around the various components of the overhead lift 20. A lift carriage 24 may be coupled to the lift housing 22. The lift carriage 24 engages the overhead rail 12 such that the overhead lift 20 is suspended from the overhead rail 12. In embodiments, the lift carriage 24 may also facilitate translation of the overhead lift 20 along the overhead rail 12 with support wheels (not shown) rotatably affixed to the lift carriage 24. In some embodiments, the support wheels of the lift carriage 24 may be motorized such that the support wheels may be selectively rotated to translate the lift carriage 24 and attached overhead lift 20 along the overhead rail 12. In other embodiments, the overhead lift 20 may be moved along the overhead rail 12 by manually pulling the overhead lift 20 along the overhead rail 12 by, for example, a tether, a leash, lift strap 28, sling bar, a sling attached to the lift strap 28, or the like. In other embodiments, it is contemplated the overhead lift 20 may be stationary instead of longitudinally moveable along an overhead rail 12.

The overhead lift 20 may include a lift strap 28 that may be taken-up or paid-out from the overhead lift 20, such as from the lift housing 22. As will be described in greater detail herein, a motor 30 positioned within the lift housing 22 may be operably coupled to the lift strap 28 to controllably take-up or pay-out the lift strap 28. A subject may be attached to the lift strap 28 via a sling bar 26 or a similar accessory attached to the lift strap 28. More specifically, the sling bar 26 or a similar accessory may be attached to a harness or sling in which the subject is positioned, thereby facilitating a lifting operation, a lowering operation, a transporting operation, a supporting operation, or the like.

Still referring to FIG. 1, the overhead lift 20 may further include a hand control device 25, for operating the overhead lift 20. For example, the hand control device 25 may include any number and/or type of user interface devices (e.g., toggles, buttons, switches, touchscreens, or the like) to allow a user to operate the overhead lift 20. For example, the hand control device 25 may be communicatively coupled to the motor 30 via a wired connection 27, as illustrated in FIG. 1, or wireless connection (e.g., via Bluetooth, WiFi, cellular network, or the like). Accordingly, using the hand control device 25, a user may provide inputs to the overhead lift 20 to cause the motor 30 to take-up the lift strap 28, pay-out the lift strap 28, and/or move the overhead lift 20 along the overhead rail 12.

Extending from the overhead lift 20 may be a release strap 101 as will be described in greater detail herein. The release strap 101 may be a rod, cord, rope, or any woven or non-woven length material. For example, the release strap 101 may be any combination of rigid and/or flexible materials. As will be described in greater detail below, the release strap 101 may be engaged with and/or form part of a release assembly configured to allow for manual release of an electromagnetic brake and manual pay-out of the lift strap 28. For example, the release strap 101 may extend through a strap opening 23 formed in the lift housing 22 and connect to one or more portions of the release assembly, as will be described in greater detail herein. The release strap 101 may hang from the overhead lift 20 a length sufficient for a user positioned below the overhead lift 20 to grasp the release strap 101 without needing to ascend (e.g., by climbing a ladder) to a height of the overhead lift 20.

Figure 2:
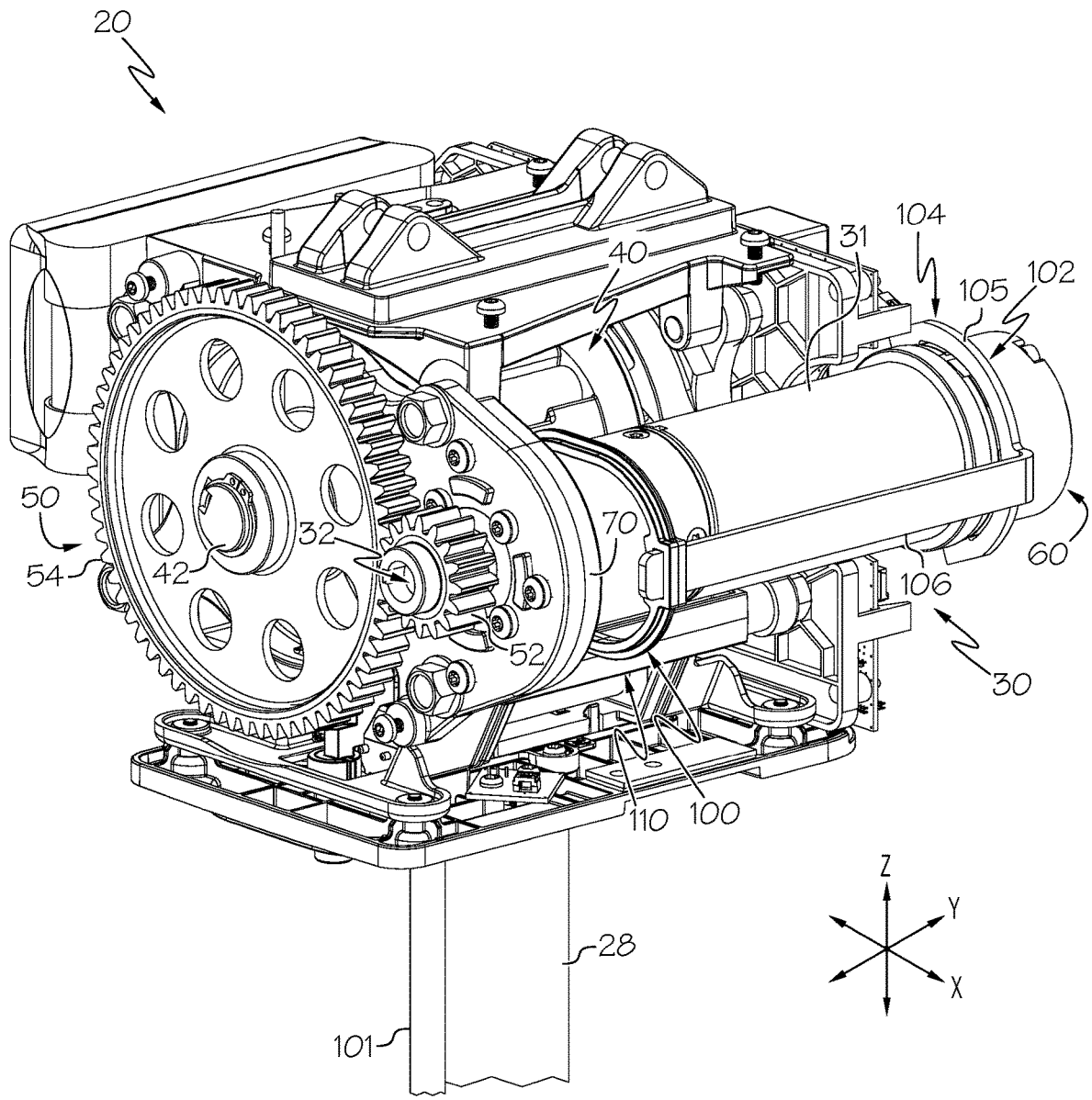
FIG. 2 schematically depicts interior components of the overhead lift of FIG. 1 including a drivetrain, a motor, an electromagnetic brake, and a release assembly, according to one or more embodiments shown and described herein.

Referring now to FIG. 2, a non-limiting example of the overhead lift 20 of FIG. 1 without the lift housing 22 is schematically depicted. For example, within the lift housing 22 may be a motor 30, a drum 40, a drivetrain 50, an electromagnetic brake 60, and a release assembly 100.

The motor 30 may be any type of motor (e.g., an AC motor, DC motor, stepper motor, or the like) which is powered via, for example, a battery or other suitable power source. The motor 30 may include a motor housing 31, which contains one or more active components of the motor 30 (e.g., magnets, coils, bearings, or the like). The motor 30 may further include a rotatable shaft 32. In embodiments, the rotatable shaft 32 may extend from the motor housing 31. The rotatable shaft 32 rotates via operation of the motor 30. The motor 30 may be a bi-directional motor that is able to rotate the rotatable shaft 32 in both a first rotational direction and a second rotation direction opposite the first rotation direction to effect pay-out and/or take-up of the lift strap 28. As noted above, the motor 30 may be communicatively coupled to the hand control device 25 depicted in FIG. 1, which may allow a user to operate the motor 30 to either take-up or pay-out the lift strap 28.

Still referring to FIG. 2, the drum 40 may be operatively coupled to the rotatable shaft 32 of the motor 30, for example via the drivetrain 50, such that rotation of the rotatable shaft 32 causes rotation of the drum 40 to rotate in one of a first rotational direction and a second rotational direction, depending on the direction of rotation of the motor 30. The drum 40 is coupled to the lift strap 28 such that rotation of the drum winds the lift strap 28 around the drum 40 or unwinds the lift strap 28 from around the drum 40. The drum 40 may include a drum shaft 42 which may extend parallel to the rotatable shaft 32 of the motor 30 and may be operatively engaged with the rotatable shaft 32, via the drivetrain 50, for example.

Still referring to FIG. 2, the drivetrain 50 may mechanically couple the drum shaft 42 to the rotatable shaft 32 such that rotation of the rotatable shaft 32 rotates the drum shaft 42, thereby rotating the drum 40 to pay-out or take-up the lift strap 28. For example, the drivetrain 50 may include a first gear 52 rigidly mounted to the rotatable shaft 32 and a second gear 54 rigidly mounted to the drum shaft 42. The first gear 52 and the second gear 54 may be meshed with one another such that rotation of the rotatable shaft 32 by the motor 30 rotates the first gear 52 which transfers rotational force to the second gear 54 and causes the drum shaft 42 to rotate thereby effectuating take-up or pay-out of the lift strap 28. It is noted that additional or different drivetrain components, such as gears, pulleys, belts, chains, and any combination thereof, may be included to effect rotation of the drum 40 via the motor 30 without departing from the scope of the present disclosure.

Still referring to FIG. 2, the electromagnetic brake 60 may be operably coupled to the motor 30, such as to the rotatable shaft 32, to prevent rotation of the rotatable shaft 32 during times where the motor 30 is not in use. For example, the electromagnetic brake 60 may be a spring-set electromagnetic power-off brake, such as an E 90R brake available from Dunkermotoren GmbH, which provides for stopping and/or holding of the rotatable shaft 32 such that the rotatable shaft 32 is non-rotatable in the absence of power. The electromagnetic brake 60 may receive power from the same or a different energy source (e.g., a battery or other suitable power source) as the motor 30. In accordance with the above description, the electromagnetic brake 60 may have an engaged state wherein the electromagnetic brake 60 prohibits rotation of the rotatable shaft 32 and a disengaged state wherein the electromagnetic brake 60 permits rotation of the rotatable shaft 32. During normal operating conditions wherein the motor 30 is operated to pay-out or take-up the lift strap 28, the electromagnetic brake 60 may be energized to move to the disengaged position. Once the flow of current to the electromagnetic brake 60 ceases, the electromagnetic brake 60 may be biased to the engaged state (e.g., via one or more biasing elements of the electromagnetic brake 60, such as a spring) such that the rotatable shaft 32 is prevented from rotating, which also prevents rotation of the drum 40 or drum shaft 42.

However, and as noted above, there may be circumstances, such as where there is an electronics malfunction, low battery, or the like where it may be desirable to move the electromagnetic brake 60 to the disengaged state without energizing the electromagnetic brake 60. Accordingly, the release assembly 100 is engaged with the electromagnetic brake 60 such that actuation of the release assembly 100 moves the electromagnetic brake 60 from the engaged state to the disengaged state to allow for manual pay-out (e.g., via pulling) of the lift strap 28. The release assembly 100 may generally include a release lever 102 and the release strap 101 operatively coupled to the release lever 102. Various actuation mechanisms which translate tensioning or pulling of the release strap 101 into actuation of the release lever 102 will be described in greater detail herein.

Figure 3:
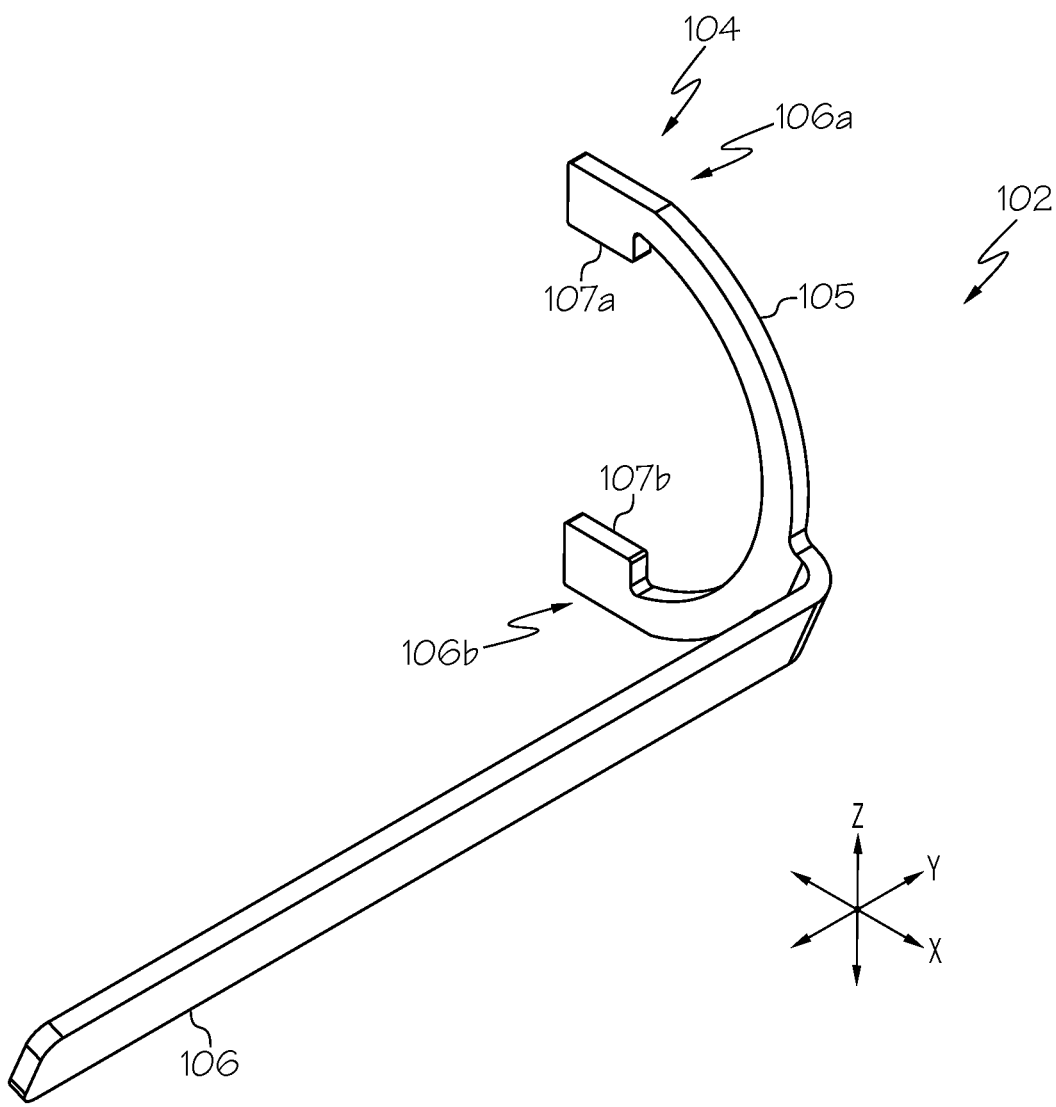
FIG. 3 schematically depicts a release lever of a release assembly, according to one or more embodiments shown and described herein.

Referring now to FIG. 3, a release lever 102 is schematically depicted in isolation from the overhead lift 20. The release lever 102 may generally include any structure or combination of structures which allow a user to move at least a portion of the electromagnetic brake 60 from the engaged state to a disengaged state, for example via application of torque. In embodiments, the release lever 102 may include one or more release prongs 104 and a lever arm 106 which extends from the one or more release prongs 104. For example, the one or more release prongs 104 may define a frame, such as an arcuate frame 105 which wraps around a portion of the electromagnetic brake 60. At either end of the arcuate frame 105 may be an engagement tab, such as a first engagement tab 107a located at a first end 106a of the arcuate frame 105 and a second engagement tab 107b located at a second end 106b of the arcuate frame 105. The first engagement tab 107a and the second engagement tab 107b may be positioned radially opposite one another so as to engage substantially opposite radial positions of the electromagnetic brake 60.

The lever arm 106 may extend from the arcuate frame 105. For example, the lever arm 106 may be positioned substantially perpendicular to a plane of the arcuate frame 105 (e.g., perpendicular to the X-Z plane of the depicted coordinate axes). In some embodiments, the lever arm 106 may be positioned equidistantly between the first engagement tab 107a and the second engagement tab 107b. In some embodiment, the lever arm 106 may be positioned closer to one of the first engagement tab 107a and the second engagement tab 107b.

Figure 4A:
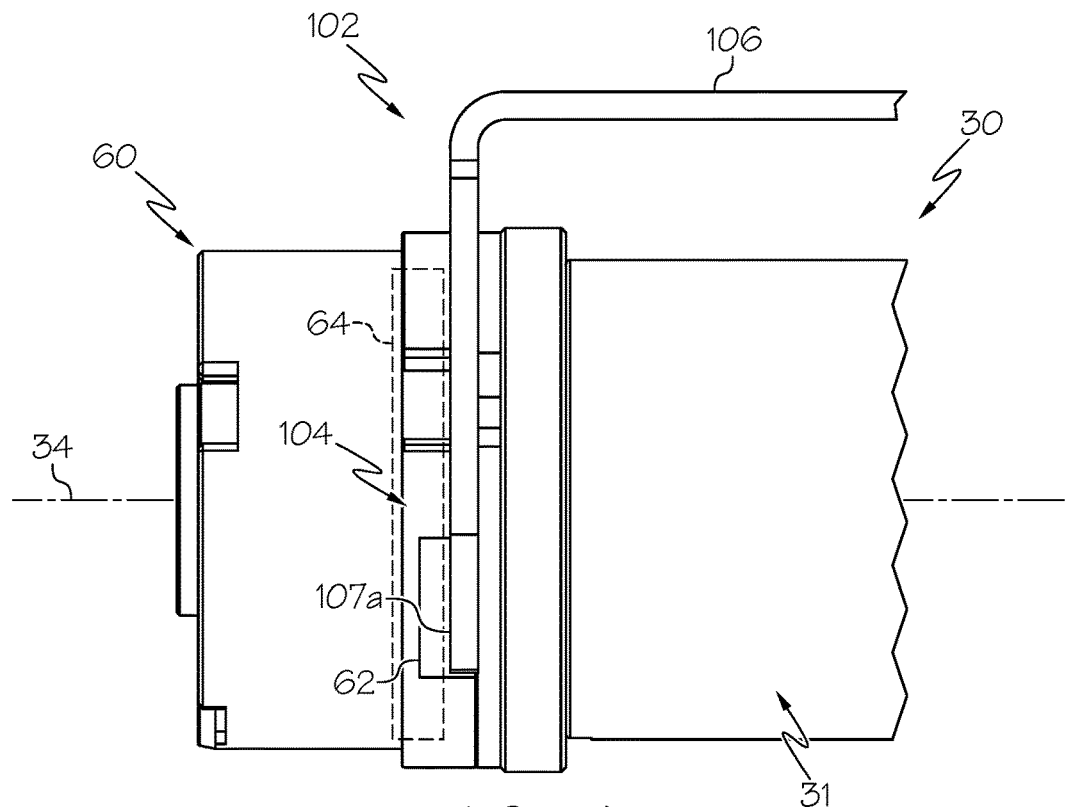
FIG. 4A schematically depicts the release lever of FIG. 3 coupled to an electromagnetic brake, wherein the release lever is positioned within a first position and the electromagnetic brake is positioned in an engaged state, according to one or more embodiments shown and described herein.
Figure 4B:
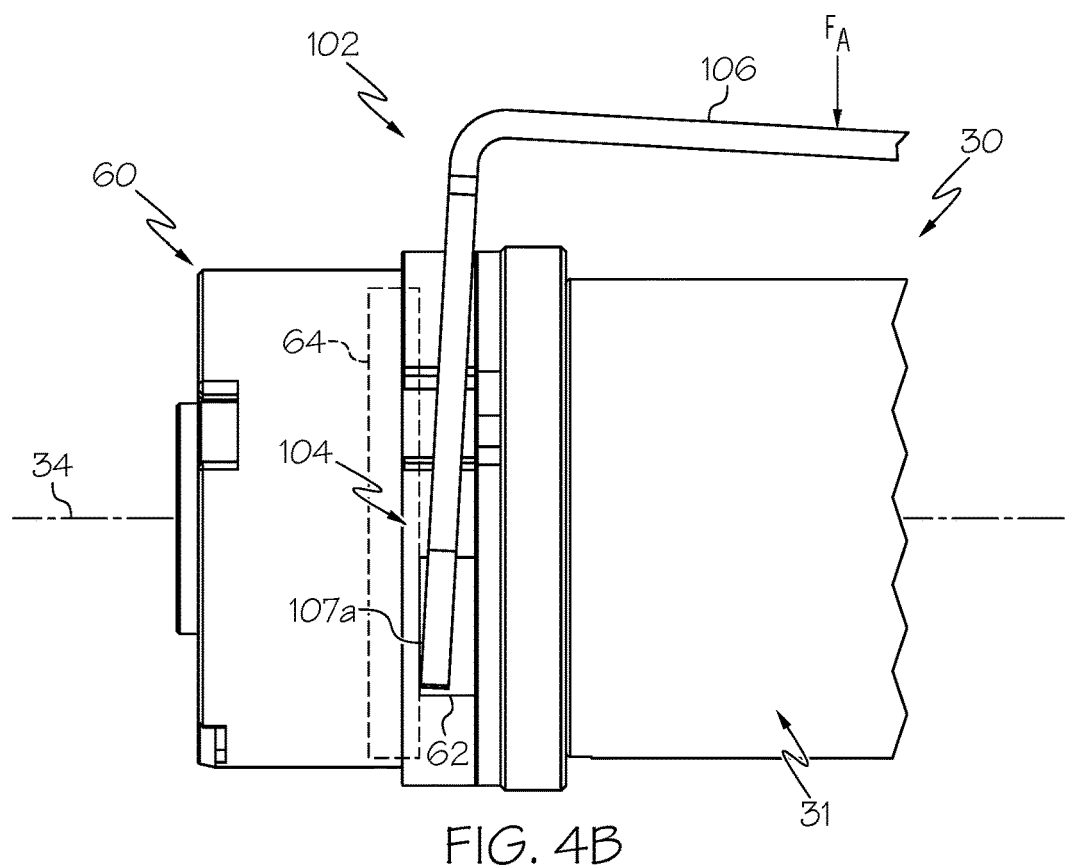
FIG. 4B schematically depicts the electromagnetic brake of FIG. 4A biased to a disengaged state via movement of the release lever to a second position, according to one or more embodiments shown and described herein.

FIGS. 4A and 4B schematically depict the release lever 102 engaged with the electromagnetic brake 60. The electromagnetic brake 60 may include one or more recesses 62 configured to receive the one or more release prongs 104. For example, the electromagnetic brake 60 may include a first recess configured to receive the first engagement tab 107a, and a second recess configured to receive the second engagement tab 107b. When positioned within the one or more recesses 62 of the electromagnetic brake 60, the release lever 102 may be securely coupled to the electromagnetic brake 60. The one or more recesses 62 may open into an internal portion of the electromagnetic brake 60 and allow the release lever 102 to engage one or more internal components 64 (e.g., disks, springs, coils, or the like) of the electromagnetic brake 60. The lever arm 106 may extend from the one or more release prongs 104 alongside the motor housing 31.

To move the electromagnetic brake 60 from an engaged state to a disengaged state, the release lever 102 may be moved from a first position, illustrated in FIG. 4A, to a second position illustrated in FIG. 4B. In embodiments, moving the release lever 102 from the first position to the second position moves the release lever 102 (e.g., the lever arm 106) closer the motor, such as radially closer to an axis of rotation 34 of the rotatable shaft 32 of the motor 30 such that the release lever 102 is pulled toward the motor 30.

FIG. 4A schematically depicts the electromagnetic brake 60 in an engaged state and the release lever 102 positioned in the first position. Referring now to FIG. 4B, an actuation force Fa is applied to the lever arm 106 which causes the release lever 102 to rotate or move to the second position, which imparts torque to bias at least a portion of the electromagnetic brake 60 to the disengaged state such that the rotatable shaft 32 of the motor 30 is free to rotate. Accordingly, moving the release lever 102 from the first position to the second position causes the electromagnetic brake 60 to move from the engaged state to the disengaged state. As illustrated, in some embodiments, one or more internal components 64 (e.g., disks, springs, coils, or the like) may interact with or be contacted by the release lever 102 such that the release lever 102 biases the one or more internal components 64 to the disengaged state such that drivetrain 50 and the rotatable shaft 32 of the motor 30 may be back driven, thereby allowing the lift strap 28 to be manually paid-out (e.g., via pulling on the lift strap 28).

The release lever 102 may be formed from any suitable material having the strength and rigidity to, in response to application of force to the lever arm 106, move at least a portion of the electromagnetic brake 60 to the disengaged state. For example, the release lever 102 may be formed of aluminum, steel, or any other metals, metal alloys, polymers, or the like.

It is noted that embodiments described herein include various assemblies which are operably engaged with the release lever 102 and configured to move the release lever 102 from the first position to the second position, thereby disengaging the electromagnetic brake 60.

Figure 5:
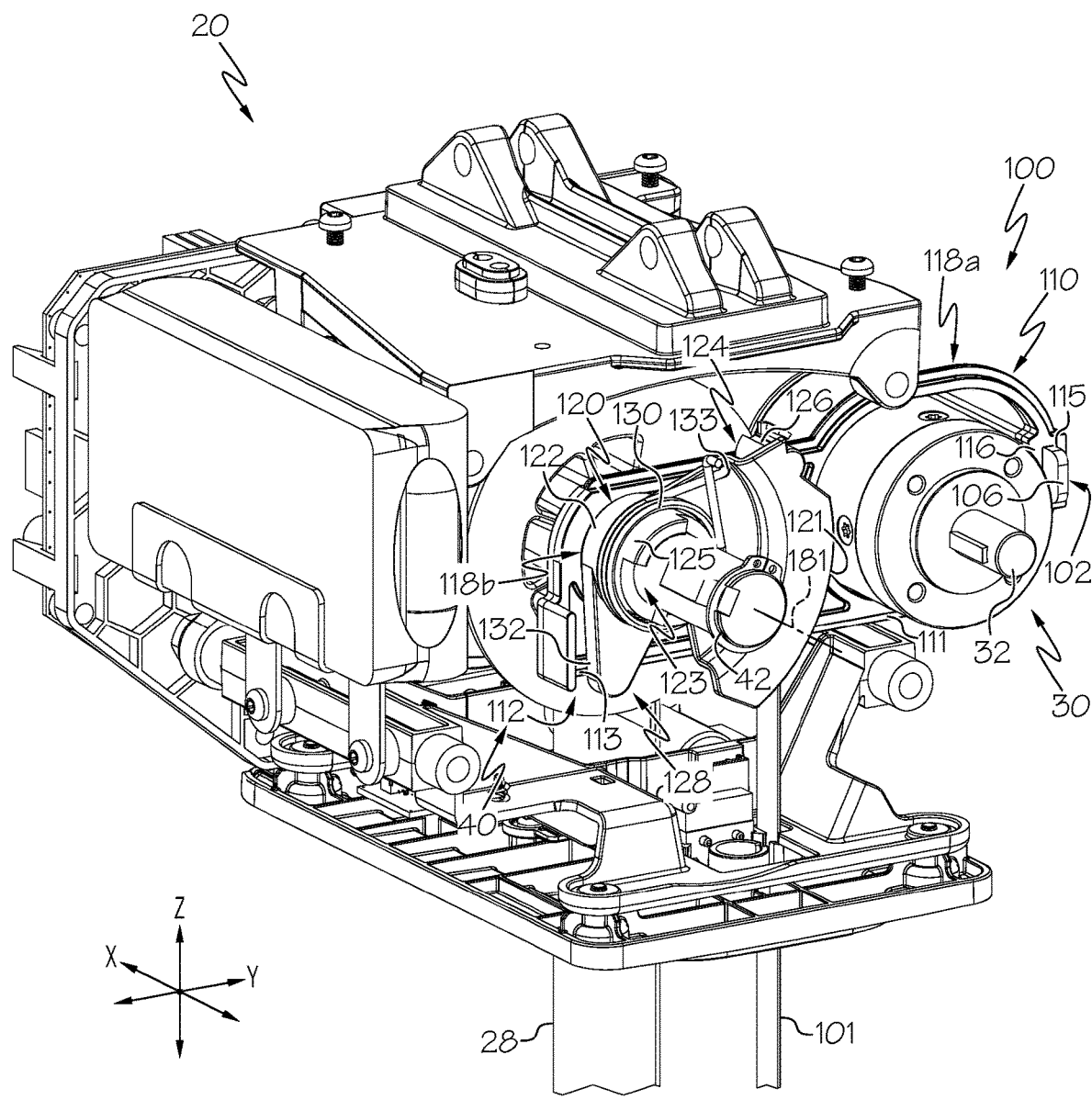
FIG. 5 schematically depicts the overhead lift of FIG. 2 with components of a drivetrain removed to better depict various components of the release assembly of FIG. 3, according to one or more embodiments shown and described herein.

Referring now to FIG. 5, the overhead lift 20 is schematically depicted with components of the drivetrain 50 removed to better depict various components of the release assembly 100 according to the present embodiment. In the depicted embodiment, in addition to the release lever 102 and the release strap 101, the release assembly 100 may further include a sliding plate 110, a cam 120, and/or a spring 130. It is noted that various embodiments may include a greater or fewer number of components without departing from the scope of the present disclosure.

The sliding plate 110 may be engaged with the release lever 102, such as the lever arm 106. Sliding of the sliding plate 110 may pull the lever arm 106 and move the release lever 102 from the first position to the second position, such as described with respect to FIGS. 4A and 4B. The sliding plate 110 may be operably coupled to the release strap 101 such that tensioning the release strap 101 causes the sliding plate 110 to slide. As will be described in greater detail below, the sliding plate 110 may be shaped to extend around the motor 30 and the drum shaft 42 and may slide in the lateral direction (i.e., the Y direction of the depicted coordinate axes) to pull the lever arm 106 to the second position. For example, pulling of the release strap 101 may cause the sliding plate 110 to slide or transition laterally from a first lateral position to a second lateral position, which pulls the release lever 102, engaged therewith to the second position described above.

Figure 6:
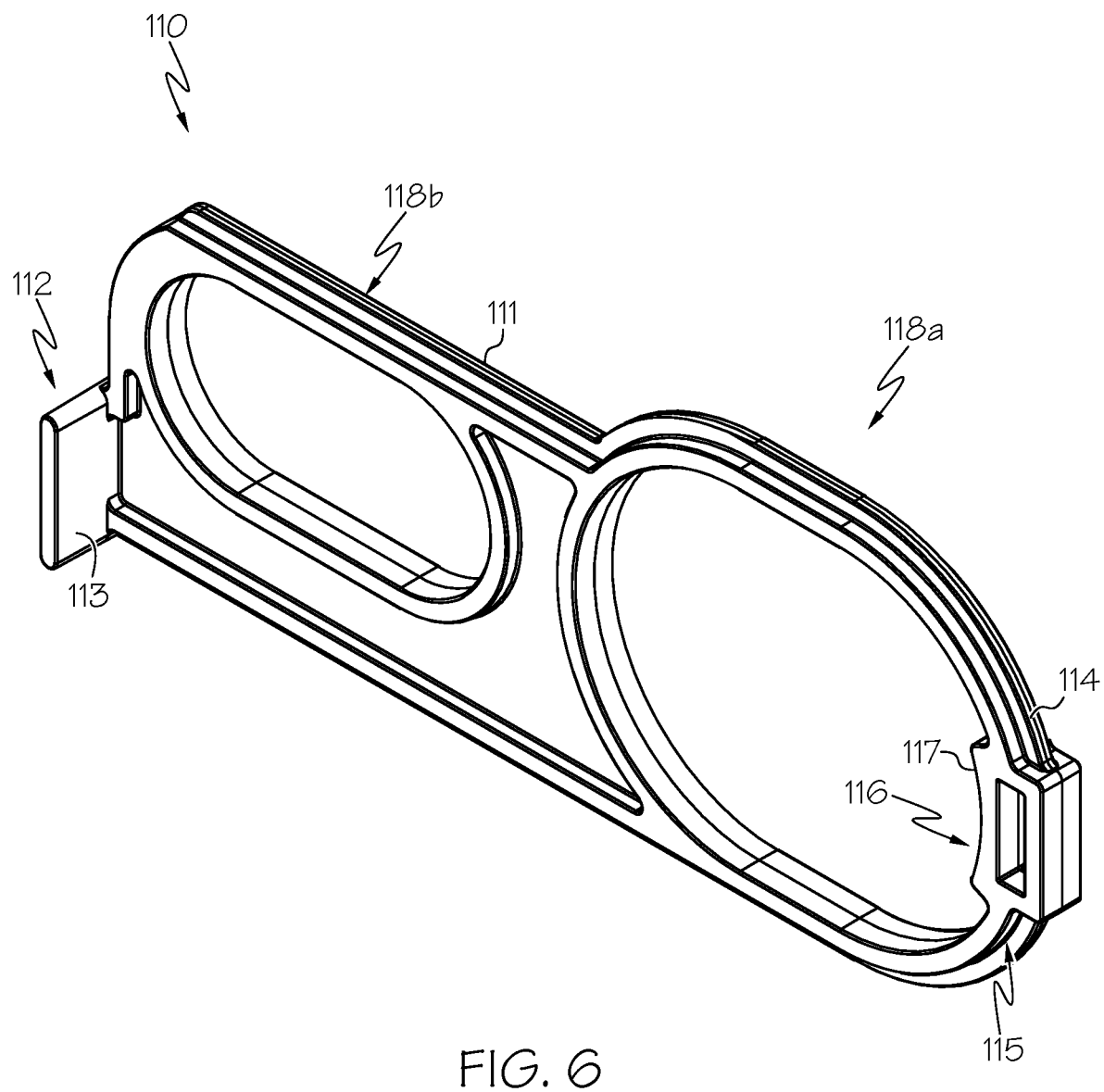
FIG. 6 schematically depicts a sliding plate of a release assembly of FIG. 5, according to one or more embodiments shown and described herein.

Referring now to FIG. 6, an exemplary embodiment of a sliding plate 110 is schematically depicted in isolation from the rest of the overhead lift 20 and release assembly 100. In the depicted embodiment, the sliding plate 110 comprises a body 111 having at least a first aperture 118a formed therein which is sized and shaped to extend around the motor 30 as illustrated in FIG. 5. For example, the first aperture 118a may be oblong in shape. Accordingly, when the sliding plate 110 moves from the first lateral position, the sliding plate 110 may move relative to the motor 30. An aperture wall 114 of the first aperture 118a may be in contact with the motor 30 or may be spaced therefrom. In some embodiments, the first aperture 118a may only be a partial hoop which circumscribes only a portion of the motor 30. In other embodiments, such as illustrated in FIG. 5, the first aperture 118a may extend completely around the motor 30.

Formed within the aperture wall 114 may be a lever opening 115 which is sized and shaped to receive the lever arm 106 of the release lever 102. In some embodiments, the portion of the aperture wall 114 providing the lever opening 115 may include a shaped projection 116 extending therefrom. In embodiments, the shaped projection 116 may be shaped to receive a shape of the motor 30 when moved in contact therewith. For example, the shaped projection 116 may define a concave surface 117, which may be configured to engage the motor housing 31 of the motor 30 when the sliding plate 110 pulls the release lever 102 to the second position. The shaped projection 116 may further aid in maintaining alignment of the release lever 102 when positioned in the second position. For example, the shaped projection 116 may aid in preventing deformation of the sliding plate 110 when pushed against the motor 30, which could otherwise cause twisting of the release lever 102. The shaped projection 116 may also act as a stop to prevent further motion of the release lever 102 past the second position and/or limit motion of other components of the release assembly 100.

In some embodiments, the body 111 of the sliding plate 110 may further define a second aperture 118b positioned adjacent, but spaced from, the first aperture 118a. With reference to FIG. 5, the second aperture 118b may be sized and shaped to extend around the drum shaft 42 of the drum 40. Similar to the first aperture 118a, the second aperture 118b may also be oblong to facilitate translation of the sliding plate 110 relative to the drum shaft 42. In some embodiments, the second aperture 118b may only be a partial hoop which circumscribes only a portion of the drum shaft 42. In other embodiments, such as those illustrated, the second aperture 118b may extend completely around drum shaft 42 of the drum 40.

Extending from the body 111 of the sliding plate 110 may be a follower plate 112, defining an engagement surface 113. The engagement surface 113 may extend substantially perpendicularly from the body 111 of the sliding plate 110. As will be described below, motion of a cam 120 against the follower plate 112 may cause the sliding plate 110 to slide from a first lateral position to a second lateral position in a direction transverse to the rotations axes of the drum shaft 42 and/or the rotatable shaft 32 of the motor 30.

The sliding plate 110 may be formed of one or more materials having a strength sufficient to support translational or sliding motion of the sliding plate 110 to pull the release lever 102 from the first position to the second position. For example, the sliding plate 110 may be formed of one or more polymer materials, one or more metals, one or more metal alloys, or any combination thereof. The sliding plate 110 may be integrally formed such that all portions of the sliding plate 110 are integrally formed as a single unitary piece such as via casting, injection molding, additive manufacturing or the like.

Figure 7A:
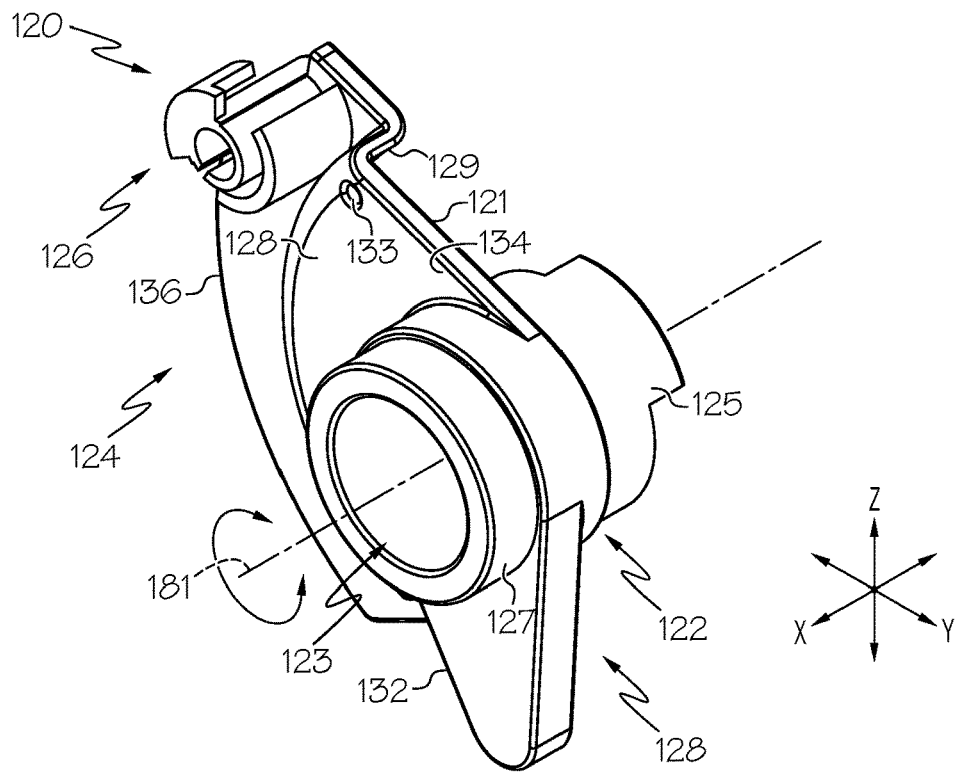
FIG. 7A schematically depicts a front perspective view of a cam of the release assembly of FIG. 5, according to one or more embodiments shown and described herein.
Figure 7B:
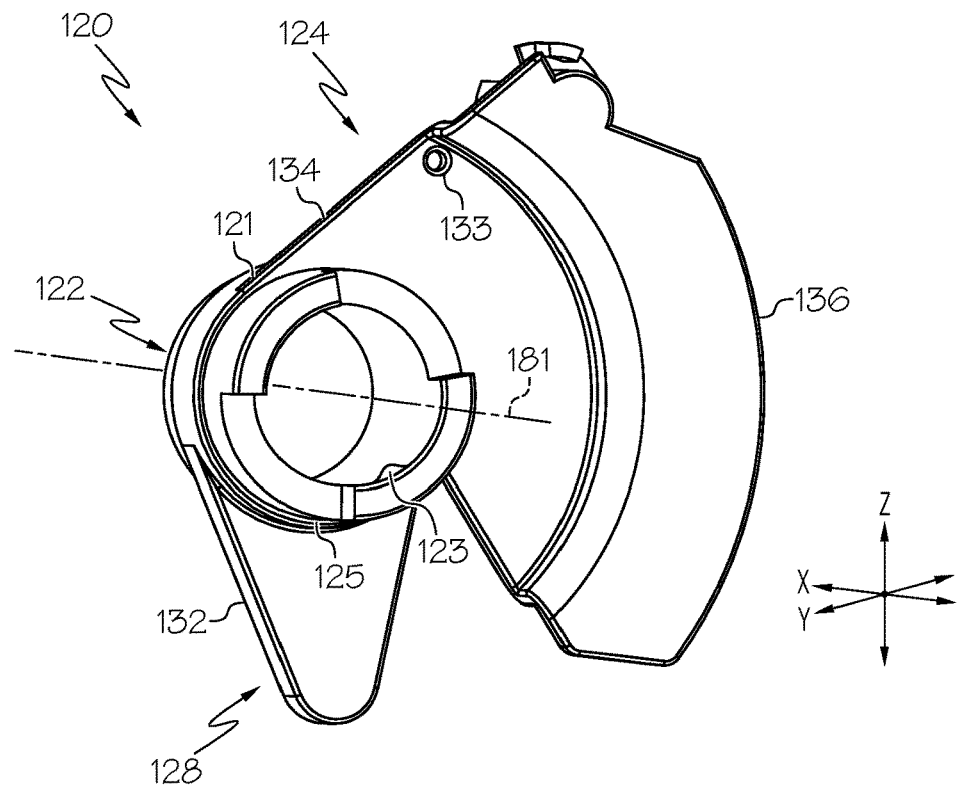
FIG. 7B schematically depicts a rear perspective view of the cam of FIG. 7A, according to one or more embodiments shown and described herein.

Referring again to FIG. 5, the cam 120 may be rotatable about a cam rotation axis 181. For example, and as depicted in FIG. 5, the cam 120 may be mounted to the drum shaft 42 and rotatable about the drum shaft 42 independent of the drum 40 such that the cam rotation axis 181 and the rotation axis of the drum shaft 42 are coincident. The cam 120 is operatively coupled to the release lever 102, such as through the sliding plate 110 for example, such that rotation of the cam 120 moves the release lever 102 between the first position and the second position. Referring now to FIGS. 7A and 7B, the cam 120 is schematically depicted in isolation from the rest of the overhead lift 20. FIG. 7A depicts a first side of the cam 120 as positioned in the depicted coordinate axes and FIG. 7B depicts an opposite side of the cam 120 according to the depicted coordinate axes. The cam 120 may include a cam body 121 that defines a hub 122, a plate 124, a release strap attachment point 126, and/or a lobe 128. It is noted that modifications to the cam body 121 may be made without departing from the scope of the present disclosure. For example, the cam body 121 may include a greater or fewer number of features without departing from the scope of the present disclosure The hub 122 may have an opening 123 formed therethrough for receiving the drum shaft 42 of the drum 40 such as illustrated in FIG. 5. In embodiments, the opening 123 may be sized such that the drum shaft 42 may freely rotate relative to the cam 120, and accordingly the cam 120 may rotate freely relative to the drum shaft 42. The hub 122 may also provide a first mounting extension 125 and a second mounting extension 127.

The plate 124 may extend from the hub 122 at a first radial position about the cam rotation axis 181. The plate 124 may include a first planar region 134 extending from the hub 122. A second planar region 136 may extend from the first planar region 134. For example, the second planar region 136 may be longitudinally stepped from the first planar region 134 via a connection strip 129 in the longitudinal direction (i.e., the X direction of the depicted coordinate axes). The plate 124 may further define a mounting location for the release strap 101. For example, extending from the plate 124 may be the strap attachment point 126, which may project from the plate 124 in the longitudinal direction (the X-direction of the depicted coordinate axes). In some embodiments, and as illustrated, the strap attachment point 126 may extend from second planar region 136. However, it is contemplated that the strap attachment point 126 may instead extend from the first planar region 134. Though not depicted, the release strap 101 may attach to the strap attachment point 126. For example, the release strap 101 may be tied, adhered, welded or the like to the strap attachment point 126. As will be described in greater detail herein, pulling of the release strap 101 causes the cam 120 to rotate about the cam rotation axis 181, which may be the same axis of rotation as the drum shaft 42.

The lobe 128 may extend from the hub 122 at a second radial position that is radially spaced from the plate 124. However, in some embodiments, the lobe 128 may not be radially spaced from the plate 124. As will be described, the lobe 128 may comprise a contact surface 132. The contact surface 132 may be arranged within the overhead lift 20 such that rotation of the cam 120 rotates the contact surface 132 of the lobe 128 into contact with the engagement surface 113 of the follower plate 112 of the sliding plate 110.

The cam 120 may be formed of one or more materials having sufficient strength to support force transfer from the cam 120 to the sliding plate 110. For example, the cam 120 may be formed of one or more polymer materials, one or more metals, one or more metal alloys, or any combination thereof. The cam 120 may be integrally formed such that all portions of the cam 120 are integrally formed as a single unitary piece such as via casting, injection molding, additive manufacturing or the like.

Referring again to FIG. 5, the release assembly 100 is illustrated mounted to the overhead lift 20. In particular, the sliding plate 110 is positioned such that the motor 30 extends through the first aperture 118a of the sliding plate 110 and the drum shaft 42 extends through the second aperture 118b of the sliding plate 110. The cam 120 may be mounted to the drum shaft 42 such that the drum shaft 42 extends through the opening 123 and the second mounting extension 127 of the hub 122 may be positioned within the second aperture 118b of the sliding plate 110 such that a central portion of the hub 122 abuts the sliding plate 110. A torsion spring 130 may be positioned on the first mounting extension 125 of the hub 122 and may be attached to the cam 120 at an attachment recess 133 formed in the plate 124. Though not depicted, the torsion spring 130 may also be mounted to another structure within the overhead lift 20, such as a frame portion 70, illustrated in FIG. 2, which may be positioned between the drivetrain 50 and the release assembly 100. The frame portion 70 may be non-rotatable such that the cam 130 rotates relative to the frame portion 70. Accordingly, twisting of the torsion spring 130, which is anchored to the frame portion 70, around the cam 120 axis as the cam 120 rotates causes a biasing force to be applied by the torsion spring 130 to the cam 120. The biasing force of the torsion spring 130 may bias the cam 120 back to a first radial position, as illustrated in FIG. 5.

Figure 8A:
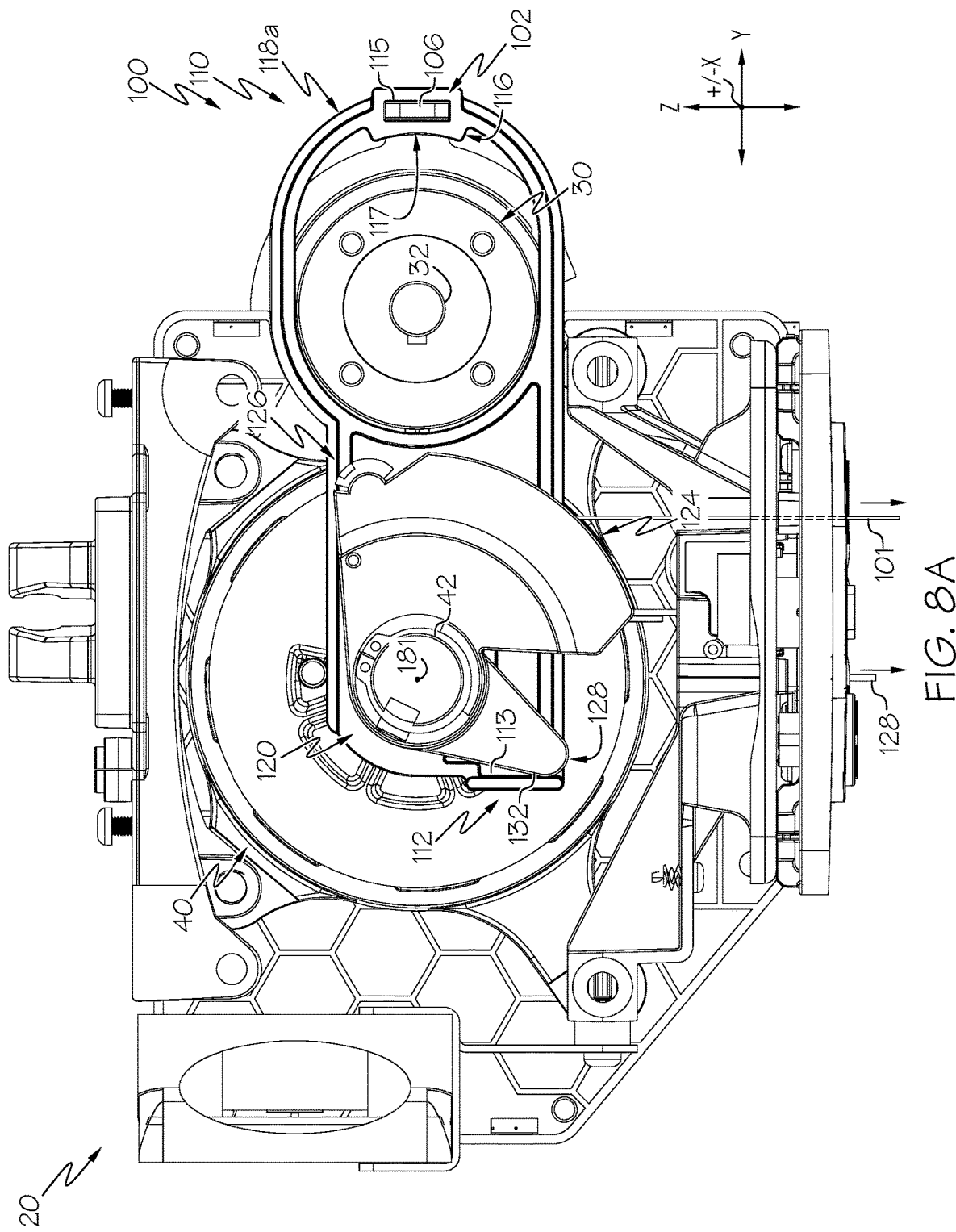
FIG. 8A schematically depicts a front view of the release assembly as mounted to the overhead lift of FIG. 5 in a unactuated position, according to one or more embodiments shown and described herein.

FIG. 8A depicts a front view of the overhead lift 20 with the release assembly 100 unactuated. In such an unactuated position, the release lever 102 is positioned in the first position, the cam 120 is positioned within the first radial position, and the sliding plate 110 is positioned in the first lateral position. With reference to FIG. 8B, as the release strap 101 is tensioned or pulled along the −Z direction of the depicted coordinate axes, the cam 120 rotates clockwise around the cam rotation axis 181/drum shaft 42, to engage the lobe 128 with the engagement surface 113 of the follower plate 112, which, in turn, imparts a force to the engagement surface 113 of the sliding plate 110. The force on the engagement surface 113 causes the sliding plate 110 to slide laterally to the second lateral position illustrated in FIG. 8B. In the second lateral position, lever opening 115, which is engaged with the lever arm 106 or the release lever 102, moves with the sliding plate 110, thereby moving the release lever 102 from the first position (illustrated in FIG. 8A) to the second position (illustrated in FIG. 8B). As noted herein, when moved to the second position the release lever 102 causes the electromagnetic brake 60 to move from the engaged state to the disengaged state, illustrated in FIG. 4B, which allows the drum shaft 42 to freely rotate to pay-out the lift strap 28. Additionally, as depicted in FIG. 8B, when moved to the second lateral position, the concave surface 117 of shaped projection 116 may contact the motor housing 31 of the motor 30, thereby limiting sliding of the sliding plate 110 and rotation of the cam 120.

While the release assembly 100 is actuated to move the release lever 102 from the first position to the second position, the electromagnetic brake 60 may remain in the disengaged state, thereby allowing for smooth pay-out of the lift strap 28 to a desired pay-out length. For example, a user may pull on the lift strap 28 to cause the drum 40 and the rotatable shaft 32 of the motor 30 to rotate. In some embodiments, a weight, such as a weight of a subject supported by the overhead lift 20, may cause the drum 40 and the rotatable shaft 32 of the motor 30 to rotate to pay-out the lift strap 28. Once the desired pay-out length of the lift strap 28 is achieved, the user may release the release strap 101.

Upon release of the release strap 101, the spring 130, depicted in FIG. 5, may bias the cam 120 back to the first radial position depicted in FIG. 8A, thereby removing the pulling force acting on the release lever 102. In turn, the electromagnetic brake 60 may be biased to the engaged state, as described above. Accordingly, upon removal of the force acting on the release lever 102, the electromagnetic brake 60 may return to the engaged state, which, in turn, pulls the release lever 102 back to the first position. Movement of the release lever 102 back to the first position may also slide the sliding plate 110 sliding back to the first lateral position due to engagement between the release lever 102 and the sliding plate 110.

Figure 9:
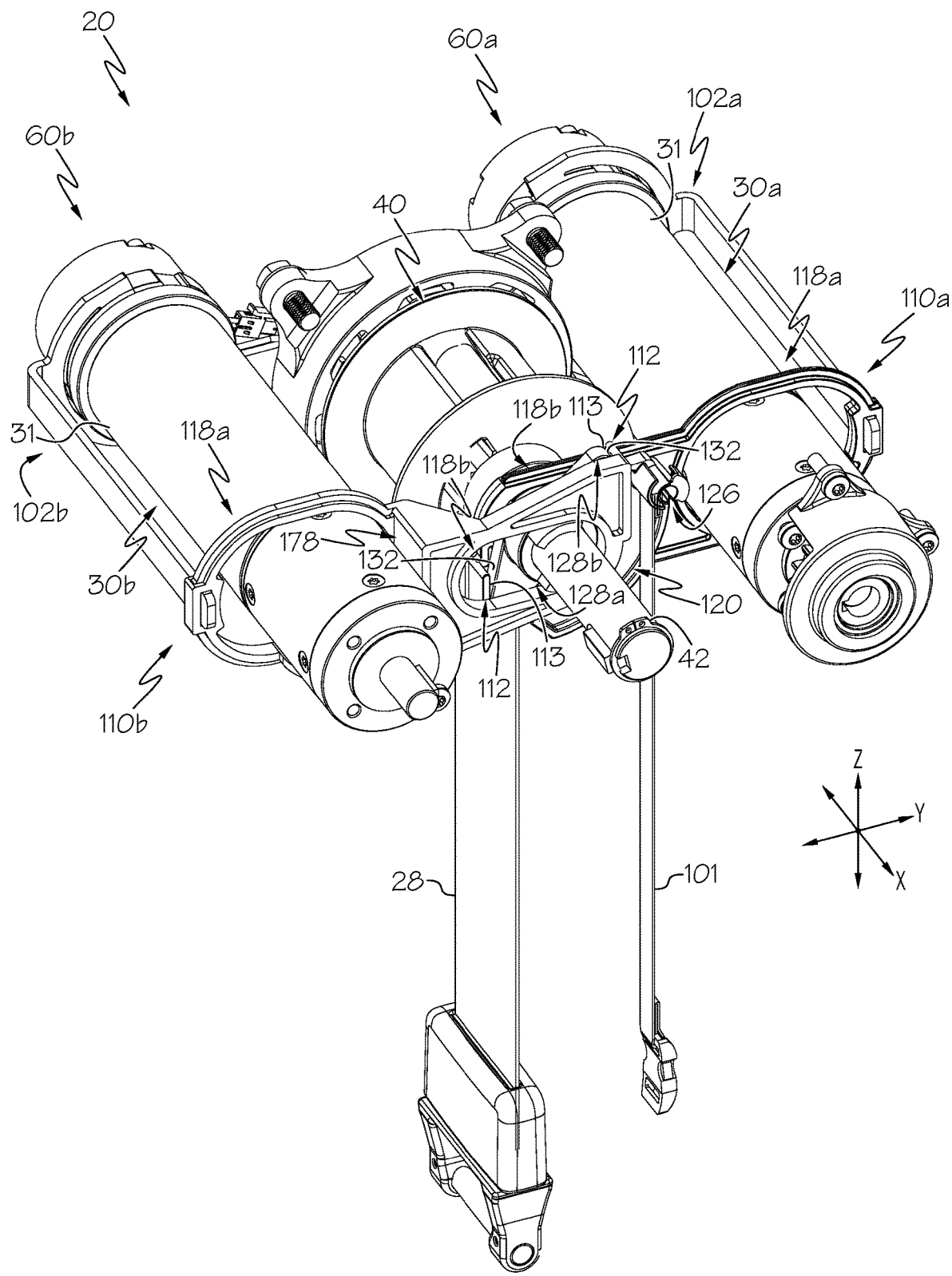
FIG. 9 schematically depicts an overhead lift including two motors operatively coupled to a drum, an electromagnetic brake coupled to each of the motors, and a release assembly configured to simultaneously disengage both electromagnetic brakes, according to one or more embodiments shown and described herein.

Referring now to FIG. 9, in embodiments, an overhead lift 20 may include a first motor 30a and a second motor 30b arranged on opposite sides of the drum 40 and drum shaft 42. The first motor 30a and the second motor 30b may each be operatively coupled to the drum 40 and configured to operate with one another to pay-out or take-up the lift strap 28 via rotation of the drum 40. The first motor 30*a* and the second motor 30*b* may be substantially similar to the motor 30 described above. Accordingly, the above description of motor 30 is applicable to the first motor 30*a* and the second motor 30*b* and will not be repeated. Overhead lifts according to such embodiments may further include a first electromagnetic brake 60*a*, a second electromagnetic brake 60*b*, a first release lever 102*a*, a second release lever 102*b*, a first sliding plate 110*a*, a second sliding plate 110*b*, and a cam 120.

The first electromagnetic brake 60*a* may be engaged with the first motor 30*a* and the second electromagnetic brake 60*b* may be engaged with the second motor 30*b*. The first electromagnetic brake 60*a* and the second electromagnetic brake 60*b* may be substantially similar to the electromagnetic brake 60 described above. Accordingly, the above description of the electromagnetic brake 60 applies equally to each of the first electromagnetic brake 60*a* and the second electromagnetic brake 60*b*.

The first release lever 102*a* and the second release lever 102*b* may be substantially similar to the release lever 102 described above. Accordingly, the above description as to the structure of the release lever 102 is generally identical to the structure of the first release lever 102*a* and the second release lever 102*b*. In particular, the first release lever 102*a* is engaged with the first electromagnetic brake 60*a* such that movement of the first release lever 102*a* from a first position to a second position biases or switches the first electromagnetic brake 60*a* from the engaged state to the disengaged state and the second release lever 102*b* is engaged with the second electromagnetic brake 60*b* such that movement of the second release lever 102*b* from a first position to a second position biases or switches the second electromagnetic brake 60*b* from the engaged state to the disengaged state. Similar to embodiment above, the first release lever 102*a* may include one or more release prongs 104 engaged with the first electromagnetic brake 60*a* and a lever arm 106 extending from the one or more release prongs 104 alongside a motor housing 31 of the first motor 30*a* and the second release lever 102*b* may include one or more release prongs 104 engaged with the second electromagnetic brake 60*b* and a lever arm 106 extending from the one or more release prongs 104 alongside a motor housing 31 of the second motor 30*b*.

The first and second sliding plates 110*a*, 110*b* are generally similar to the sliding plate 110 described above. Accordingly, the description of the sliding plate 110 applies equally to the first sliding plate 110*a* and the second sliding plate 110*b* unless otherwise noted and/or apparent from the figures. For instance, the second sliding plate 110*b* may include an offset portion 178 such that the first aperture 118*a* is longitudinally offset (e.g., in the X direction of the depicted coordinate axes) from the second aperture 118*b*. The offset between the first aperture 118*a* and the second aperture 118*b* may allow for a more compact profile of the release assembly 100 within the lift housing 22 of the overhead lift 20. Moreover, the longitudinal offset may allow for the first release lever 102*a* and the second release lever 102*b* to be substantially identical without need for the second release lever 102*b* to have a longer lever arm 106 as compared to the first release lever 102*a*.

Figure 10:
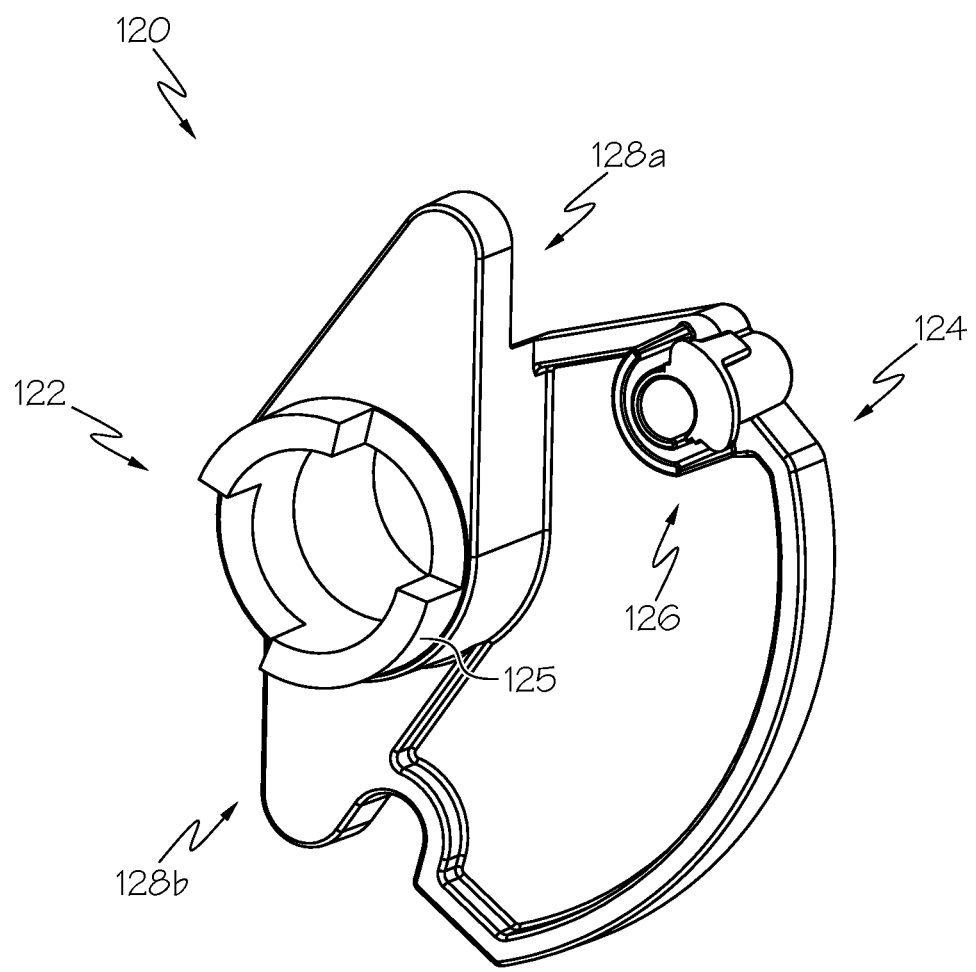
FIG. 10 schematically depicts a cam of the release assembly of FIG. 9, according to one or more embodiments shown and described herein.

Referring now to FIG. 10 the cam 120 of the present embodiment is schematically depicted in isolation to better see various features of the cam 120. The cam 120 of the present embodiment may be similar to the cam 120 described above with respect to the single motor embodiments with some variations for application in a two-motor overhead lift 20. Accordingly, the above description is applicable to the present embodiment unless otherwise noted or apparent. In particular, in the present embodiment, the cam 120 includes a first lobe 128*a* and a second lobe 128*b*. Each of the first lobe 128*a* and the second lobe 128*b* may define a contact surface 132. When assembled as illustrated in FIG. 9, the first lobe 128*a* may be positioned to contact the engagement surface 113 of the first sliding plate 110*a* and the second lobe 128*b* may be by positioned to contact an engagement surface 113 of the second sliding plate 110*b*. For example, the first lobe 128*a* and the second lobe 128*b* may be radially spaced from one another. For example, the first lobe 128*a* may be positioned diametrically opposite the second lob 128*b*. However, other positions are contemplated and possible.

Figure 11:
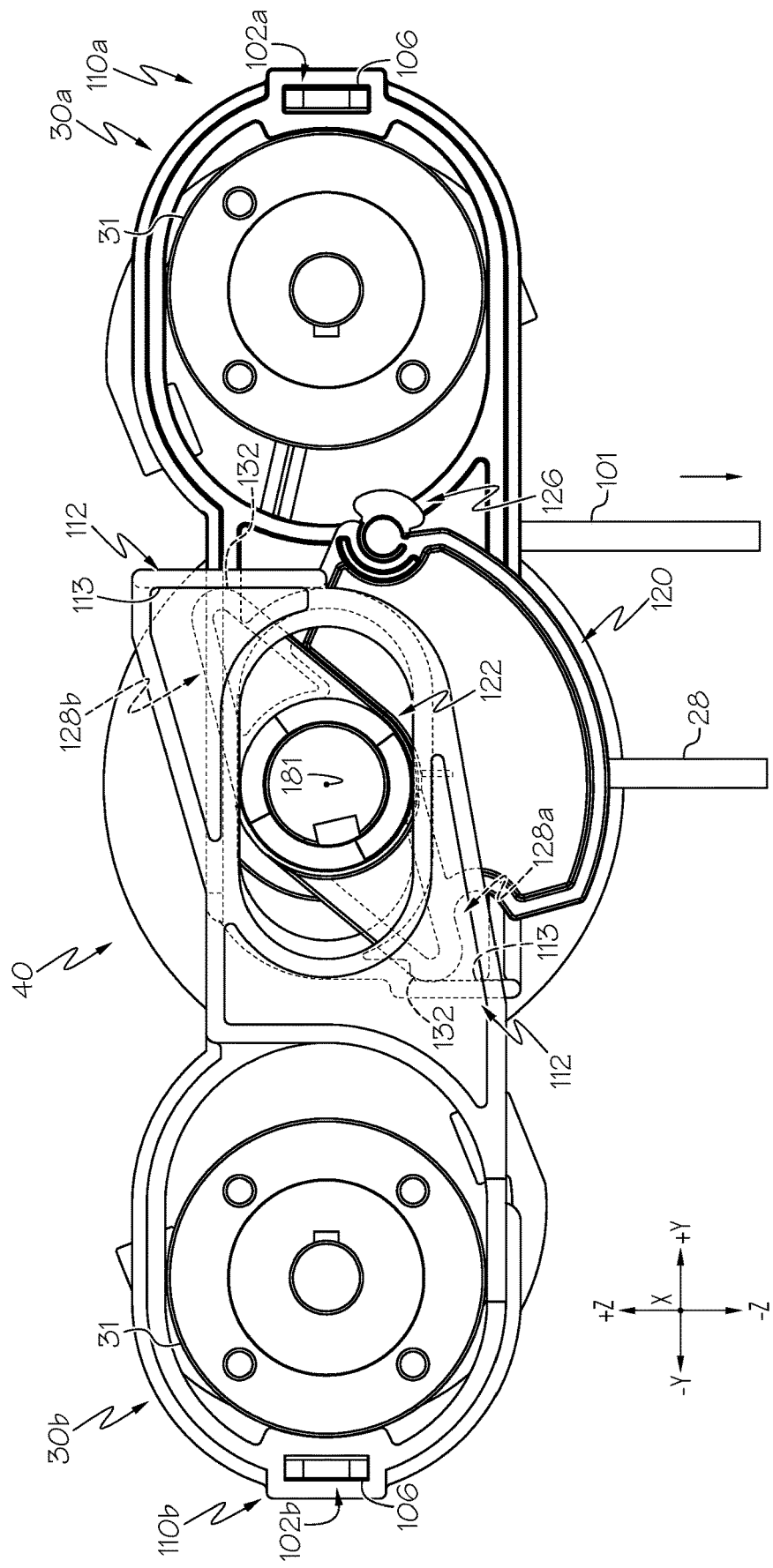
FIG. 11 schematically depicts the release assembly of FIG. 9 shifted to an actuated position, according to one or more embodiments shown and described herein.

Referring now to FIG. 11, as the cam 120 is rotated, the first lobe 128*a* contacts and presses the engagement surface 113 of the first sliding plate 110*a* and the second lobe 128*b* contacts and pressed the engagement surface 113 of the second sliding plate 110*b*. Each of the first sliding plate 110*a* and the second sliding plate 110*b* are thereby actuated to slide laterally (i.e., in the Y direction of the depicted coordinate axes) toward one another, which causes each of the first release lever 102*a* and the second release lever 102*b* to move from the first position to the second position. For example, as the first sliding plate 110*a* and the second sliding plate 110*b* slide laterally toward one another, each of the first release lever 102*a* and the second release lever 102*b* be may be pulled toward one another. As the first release lever 102*a* and the second release lever 102*b* are pulled toward one another to the second position, the electromagnetic brakes 60*a*, 60*b* are moved from the engaged state to the disengaged state, as described above. In embodiments, each of the first sliding plate 110*a* and the second sliding plate 110*b* may be moved simultaneously to simultaneously disengaged the first and second electromagnetic brakes 60*a*, 60*b*. However, it is contemplated that in some embodiments, the various components may not be moved simultaneously. For example, the first electromagnetic brake 60*a* may be disengaged first and the second electromagnetic brake 60*b* may be disengaged thereafter, or vice versa. However, simultaneous motion may increase the speed and efficiency at which the first electromagnetic brake 60*a* and the second electromagnetic brake 60*b* may be disengaged. As noted herein, by moving both the first electromagnetic brake 60*a* and the second electromagnetic brake 60*b* to the disengaged state, the lift strap 28 may be manually paid-out. As noted above, upon release of the release strap 101, the cam 120 may be spring biased, via a torsion spring such as described above, to rotate the cam 120 back to the first radial position illustrated in FIG. 9, which releases the force acting on the first release lever 102*a* and the second release lever 102*b*. The bias of the electromagnetic brakes 60*a*, 60*b* may pull the first release lever 102*a* and the second release lever 102*b* back to the first position, which in turn, returns to first sliding plate 110*a* and the second sliding plate 110*b* back to the first lateral position, as illustrated in FIG. 9.

It is noted that while embodiments described above may generally include a sliding plate 110, a cam 120, and/or a spring 130, different structures are contemplated and possible for moving the release lever 102 from the first position to the second position, thereby moving an electromagnetic brake from an engaged state to a disengaged state. The below embodiments may be implemented in both single-motor overhead lifts and dual-motor overhead lifts.

Figure 12:
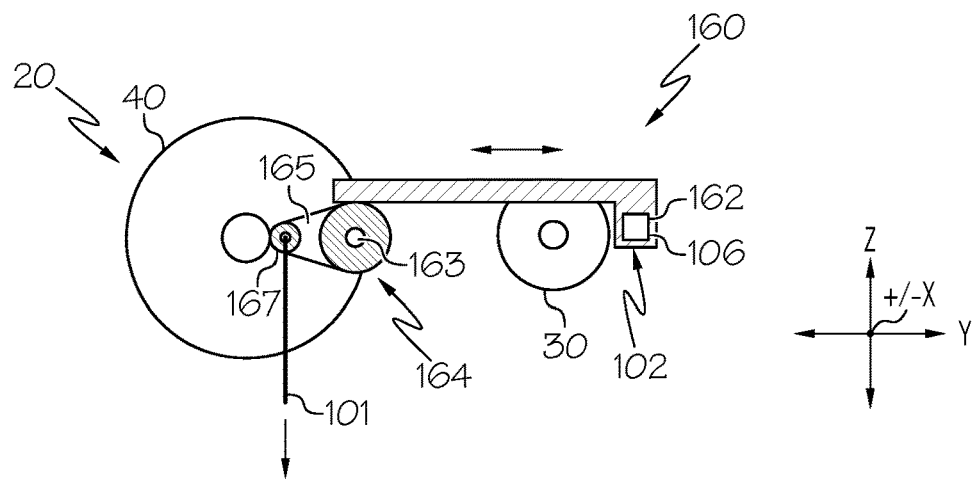
FIG. 12 schematically depicts another release assembly for an overhead lift including a rack gear and a pinion gear, according to one or more embodiments shown and described herein.

FIG. 12 schematically depicts an overhead lift 20 including the motor 30 and the drum 40. In the present embodiment, the release lever 102 may be engaged to a rack gear 160. For example, the rack gear 160 may have an opening 162 formed therethrough for receiving the lever arm 106 of the release lever 102. A pinion gear 164 may be meshed with the rack gear 160. A cam 165 may be coupled to the pinion gear 164 and may define an attachment point 167 to which the release strap 101 may be attached. The pinion gear 164 may be rotatable about a rotation axis 163, but unable to translate laterally (in the Y direction of the depicted coordinate axis). Upon pulling of the release strap 101, the pinion gear 164 may rotate. Due to the engagement between the rack gear 160 and the pinion gear 164, upon rotation of the pinion gear, the rack gear 160 translates laterally toward the drum 40, which in turn pulls the release lever 102 from the first position to the second position, thereby disengaging an electromagnetic brake 60, as described above. Upon release of the release strap 101, the bias of the electromagnetic brake 60 to the engaged state may cause the electromagnetic brake 60 to return to the engaged state, which pulls the release lever 102 to the first position. The movement of the release lever 102 back to the first position may pull the rack gear 160 back to its original position which may cause the pinion gear 164 to rotate back to its original position. In some embodiments, the pinion gear may also be biased, e.g., via a spring, back to the pinion gear 164's original position, which moves the rack gear 160 laterally back to its original position. The embodiment illustrated in FIG. 12 may be adapted to a two motor lift such as depicted in FIGS. 9 and 10 by incorporating a second release lever engaged with a second electromagnetic brake and a second pinion gear and rack gear that interact with the second release lever in a manner similar to the first release lever.

Figure 13:
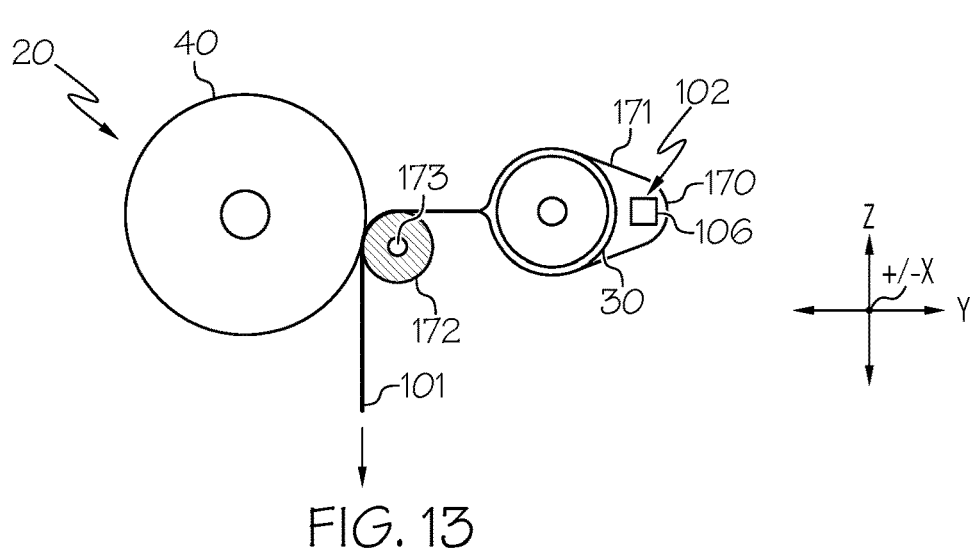
FIG. 13 schematically depicts another release assembly for an overhead lift including a pulley and belt interaction, according to one or more embodiments shown and described herein.

FIG. 13 schematically depicts an overhead lift 20 including the motor 30 and the drum 40. In the present embodiment, the release lever 102 is engaged by a strap 170, which may be formed as part of the release strap 101. A looped portion 171 of the strap 170 may circumscribe the motor 30. The strap 170 may be arranged around a pulley 172 having a pulley axis 173 about which the pulley 172 rotates, such that pulling on the release strap 101 causes the looped portion 171 to be pulled laterally in the Y direction of the depicted coordinate axes toward the pulley 172, thereby moving the release lever 102 from the first position to the second position, as described above. Upon release of the release strap 101, the bias of the electromagnetic brake 60 to the engaged state may cause the electromagnetic brake 60 to return to the engaged state, which pulls the release lever 102 to the first position. In some embodiments, the pulley 172 may be biased, e.g., via a spring bias, to aid in returning or providing slack in the release strap 101 to allow the release lever 102 to return to the first position. The embodiment illustrated in FIG. 13 may be adapted to a two motor lift such as depicted in FIGS. 9 and 10 by incorporating a second release lever engaged with a second electromagnetic brake and a second looped portion and a pulley that interact with the second release lever in a manner similar to the first release lever.

Figure 14:
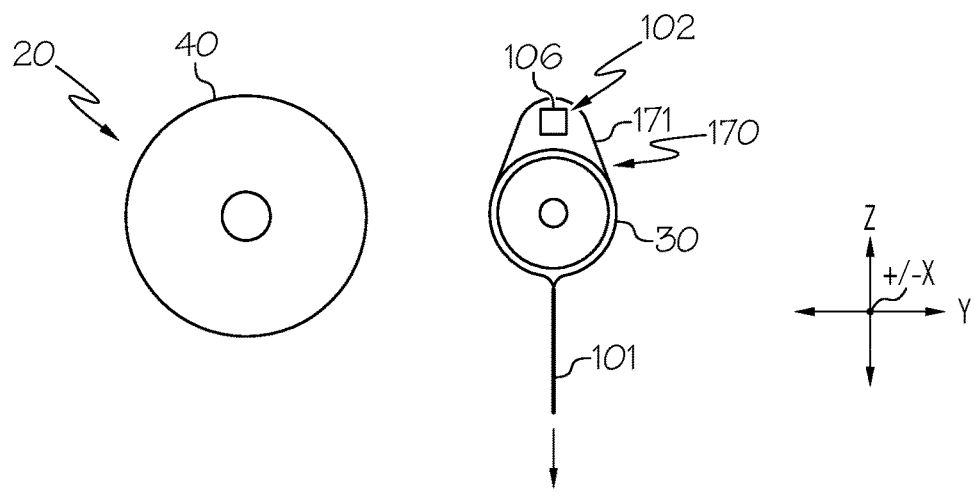
FIG. 14 schematically depicts another release assembly for an overhead lift wherein a lever arm of a release lever is positioned above a motor of the overhead lift, according to one or more embodiments shown and described herein.

FIG. 14 schematically depicts an embodiment similar to FIG. 13 but without a pulley. In this embodiment, the lever arm 106 of the release lever 102 is arranged above the motor 30 in the Z direction of the depicted coordinate axes. Accordingly, in this embodiment, the looped portion 171 of the strap 170 is arranged around the lever arm 106 of the release lever 102. Pulling on the release strap 101 directly causes the release lever 102 to move from the first position to the second position, as described above, thereby disengaging the electromagnetic brake 60. Upon release of the release strap 101, the bias of the electromagnetic brake 60 to the engaged state may cause the electromagnetic brake 60 to return to the engaged state, which pulls the release lever 102 to the first position. The embodiment illustrated in FIG. 14 may be adapted to a two motor lift such as depicted in FIGS. 9 and 10 by incorporating a second release lever engaged with a second electromagnetic brake and a second looped portion and/or a second strap that engages second release lever in a manner similar to the first release lever.

Figure 15:
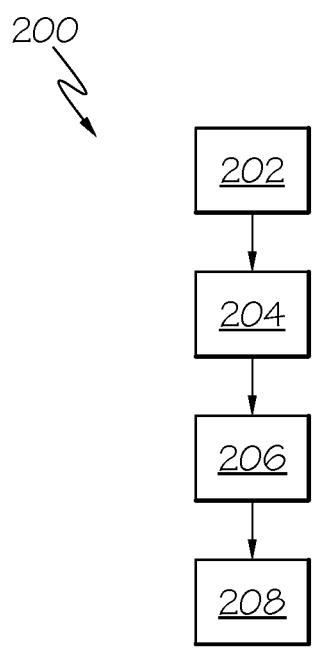
FIG. 15 schematically depicts a flow chart illustrating a method for disengaging an electromagnetic brake of an overhead lift to allow manual pay-out of a lift strap, according to one or more embodiments shown and described herein.

FIG. 15 depicts a flow chart illustrating a method 200 for manually disengaging an electromagnetic brake 60 according to any of the embodiments described herein.

At box 202 the method 200 may including pulling a release strap 101 operatively coupled to a release lever 102 thereby moving the release lever 102 from the first position to the second position resulting in disengaging the electromagnetic brake 60, as described herein. At box 204, the method 200 may further include holding the release strap 101 so as to maintain disengagement of the electromagnetic brake 60 for a desired period of time. The method 200, at box 206 includes pulling the lift strap 28 to pay-out a desired length of the lift strap. As the electromagnetic brake 60 remains in a disengaged state throughout pay-out, the lift strap 28 is smoothly released from the overhead lift 20 in a continuous motion or for whatever pulling stroke is applied by the user. Once the desired amount of lift strap 28 is paid-out, the method 200 may include at box 208, releasing the release strap 101. As noted herein, above, release of the release strap 101 may release the force acting on the release lever 102. Additionally, the electromagnetic brake 60 may be biased to the engaged state, such that releasing the release strap 101 allows the electromagnetic brake 60 to return to the engaged state.

It should now be understood that embodiments as described herein are directed to overhead lifts including a release assembly which allows for manual pay-out of a lift strap during such circumstances as, for example, where a motor of the overhead lift is otherwise not operational or it is desirable to not operate the motor to effect pay-out of the lift strap. Release assemblies according to the present disclosure may generally include a release lever and a release strap operatively coupled (for example, through one or more components) to the release lever, such that tensioning or pulling on the release strap moves the release lever from a first position to a second position that switches the electromagnetic brake to the disengaged state. The release strap may hang from the overhead lift so as to be grasped and pulled by a user standing on the ground or supported by the overhead lift (e.g., via sling). Accordingly, a user may disengage the electromagnetic brake from a position below the overhead lift to thereby enable a user to pull or pay-out additional length of the lift strap as desired. Additionally, as the electromagnetic brake is disengaged, the lift strap may be smoothly and uninterruptedly paid-out as desired until the user releases the release strap, which may allow the electromagnetic brake to move back to the engaged state. These and additional features and benefits will be described in greater detail below.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An overhead lift comprising:
    a lift strap;
    a motor comprising a rotatable shaft coupled to the lift strap, the rotatable shaft comprising a first rotational direction wherein the lift strap is paid-out from the overhead lift and a second rotational direction wherein the lift strap is taken-up into the overhead lift;
    an electromagnetic brake coupled to the rotatable shaft, the electromagnetic brake comprising an engaged state wherein the electromagnetic brake prohibits rotation of the rotatable shaft and a disengaged state wherein the electromagnetic brake permits rotation of the rotatable shaft; and
    a release assembly engaged with the electromagnetic brake, wherein actuation of the release assembly switches the electromagnetic brake from the engaged state to the disengaged state, the release assembly comprising:
        a release lever engaged with the electromagnetic brake and moveable between a first position and a second position, wherein the release lever switches the electromagnetic brake to the disengaged state when in the second position; and
        a release strap coupled to the release lever, wherein tensioning of the release strap moves the release lever from the first position to the second position thereby switching the electromagnetic brake from the engaged state to the disengaged state.

2. The overhead lift of claim 1, wherein motion of the release lever from the first position to the second position moves a lever arm of the release lever closer to an axis of rotation of the rotatable shaft.

3. The overhead lift of claim 1, wherein:
    the release assembly further comprises a sliding plate engaged with the release lever;
    the release strap is coupled to the sliding plate such that tensioning the release strap slides the sliding plate from a first lateral position to a second lateral position; and
    the sliding plate pulls the release lever to the second position when the sliding plate transitions from the first lateral position to the second lateral position.

4. The overhead lift of claim 3, wherein:
    the sliding plate comprises:
        an aperture extending around the motor; and
        a lever opening formed within a wall of the aperture; and
    a lever arm of the release lever extends through the lever opening thereby engaging the lever arm with the sliding plate.

5. The overhead lift of claim 3, wherein:
    the release assembly further comprises a cam rotatable about a cam rotation axis and comprising a lobe;
    the cam is coupled to the release strap such that tensioning the release strap causes the cam to rotate about the cam rotation axis from a first radial position to a second radial position;
    the sliding plate further comprises a follower plate positioned to contact the lobe; and
    rotation of the cam to the second radial position causes the lobe to push against the follower plate and slide the sliding plate from the first lateral position to the second lateral position thereby pulling the release lever from the first position to the second position and releasing the electromagnetic brake.

6. The release assembly of claim 5, further comprising a torsion spring biasing the cam to the first radial position such that the torsion spring returns the cam to the first radial position upon release of tension on the release strap.

7. The overhead lift of claim 1, wherein:
    the release assembly further comprises:
        a pinion gear coupled to the release strap; and
        a rack gear meshed with the pinion gear and coupled to the release lever; and
    tensioning the release strap rotates the pinion gear thereby laterally translating the rack gear and pulling the release lever to the second position.

8. The overhead lift of claim 1, wherein:
    the release assembly further comprises a pulley;
    the lift strap is arranged around the pulley and is attached to the release lever; and
    tensioning the release strap causes the pulley to rotate about a pulley axis and causes the release lever to move from the first position to the second position, thereby releasing the electromagnetic brake.

9. An overhead lift comprising:
    a lift strap;
    a drum coupled to the lift strap, the drum being rotatable in a first rotational direction wherein the lift strap is paid-out from the overhead lift and in a second rotational direction wherein the lift strap is taken-up into the overhead lift;
    a motor comprising a rotatable shaft coupled to the drum such that rotation of the rotatable shaft rotates the drum in the first rotational direction or the second rotational direction;
    an electromagnetic brake coupled to the rotatable shaft, the electromagnetic brake comprising an engaged state wherein the electromagnetic brake prohibits rotation of the rotatable shaft and a disengaged state wherein the electromagnetic brake permits rotation of the rotatable shaft; and
    a release assembly engaged with the electromagnetic brake, wherein actuation of the release assembly switches the electromagnetic brake from the engaged state to the disengaged state, the release assembly comprising:
        a release lever engaged with the electromagnetic brake and moveable between a first position and a second position, wherein the release lever switches the electromagnetic brake to the disengaged state when in the second position;
        a cam coupled to the release lever, wherein the cam is rotatable from a first radial position to a second radial position, wherein rotation to the second radial position causes the release lever to move to the second position; and
        a release strap coupled to the cam, wherein tensioning of the release strap moves the cam from the first radial position to the second radial position, which moves the release lever from the first position to the second position thereby switching the electromagnetic brake from the engaged state to the disengaged state.

10. The overhead lift of claim 9, wherein motion of the release lever from the first position to the second position moves a lever arm of the release lever closer to an axis of rotation of the rotatable shaft.

11. The overhead lift of claim 9, wherein:
the release assembly further comprises a sliding plate engaged with the release lever;
the cam is engaged with the sliding plate such that movement of the cam from the first radial position to the second radial position slides the sliding plate from a first lateral position to a second lateral position; and
the sliding plate pulls the release lever to the second position as the sliding plate transitions from the first lateral position to the second lateral position.

12. The overhead lift of claim 11, wherein:
the sliding plate comprises:
a first aperture extending around the motor;
a second aperture extending around a drum shaft of the drum; and
a lever opening formed within a wall of the first aperture; and
a lever arm of the release lever extends through the lever opening thereby engaging the lever arm with the sliding plate.

13. The overhead lift of claim 12, wherein:
the cam comprises a lobe;
the sliding plate further comprises a follower plate positioned to contact the lobe; and
rotation of the cam to the second radial position causes the lobe to push against the follower plate and slide the sliding plate from the first lateral position to the second lateral position thereby pulling the release lever from the first position to the second position and releasing the electromagnetic brake.

14. The release assembly of claim 9, further comprising a torsion spring biasing the cam to the first radial position such that the torsion spring returns the cam to the first radial position upon release of tension on the release strap.

15. The overhead lift of claim 9, wherein the cam comprises:
a plate; and
a strap attachment point extending from the plate.

16. The overhead lift of claim 9, wherein the cam comprises:
a hub defining an opening, wherein a drum shaft of the drum is positioned within the opening;
a first planar region extending from the hub;
a second planar region extending from the first planar region, wherein the second planar region is longitudinally stepped from the first planar region via a connection strip in a longitudinal direction; and
a strap attachment point extending from the second planar region, wherein the release strap is coupled to the strap attachment point.

17. An overhead lift comprising:
a lift strap;
a drum coupled to the lift strap and rotatable in a first rotational direction wherein the lift strap is paid-out from the overhead lift and in a second rotational direction wherein the lift strap is taken-up into the overhead lift;
a first motor coupled to the drum;
a second motor coupled to the drum;
a first electromagnetic brake selectively engaged with the first motor;
a second electromagnetic brake selectively engaged with the second motor, wherein each of the first electromagnetic brake and the second electromagnetic brake comprise an engaged state prohibiting rotation of the drum and a disengaged state permitting rotation of the drum; and
a release assembly engaged with the first electromagnetic brake and the second electromagnetic brake, wherein actuation of the release assembly switches the first electromagnetic brake and the second electromagnetic brake from the engaged state to the disengaged state, the release assembly comprising:
a first release lever engaged with the first electromagnetic brake;
a second release lever engaged with the second electromagnetic brake, wherein each of the first release lever and the second release lever are moveable from a first position to a second position which switches the first electromagnetic brake and the second electromagnetic brake, respectively, from the engaged state to the disengaged state; and
a release strap coupled to the first release lever and the second release lever, wherein tensioning of the release strap moves the first release lever and the second release lever from the first position to the second position thereby switching the first electromagnetic brake and the second electromagnetic brake from the engaged state to the disengaged state.

18. The overhead lift of claim 17, wherein:
the first release lever comprises a lever arm extending alongside the first motor, wherein the first release lever is moveable between a first position and a second position, wherein the release lever switches the first electromagnetic brake to the disengaged state when moved to the second position; and
the second release lever comprises a lever arm extending alongside the second motor, wherein the second release lever is moveable between a first position and a second position, wherein the release lever switches the first electromagnetic brake to the disengaged state when moved to the second position.

19. The overhead lift of claim 18, wherein motion of the first release lever and the second release lever from the first position to the second position moves the first release lever and the second release lever closer to an axis of rotation of the first motor and the second motor, respectively.

20. The overhead lift of claim 19, wherein:
the release assembly further comprises:
a first sliding plate engaged with the first release lever; and
a second sliding plate engaged with the second release lever;
the release strap is coupled to the first sliding plate and the second sliding plate such that tensioning the release strap slides the first sliding plate and the second sliding plate from a first lateral position to a second lateral position;
the first sliding plate pulls the first release lever to the second position when the first sliding plate transitions from the first lateral position to the second lateral position; and
the second sliding plate pulls the second release lever to the second position when the second sliding plate transitions from the first lateral position to the second lateral position.

* * * * *